(12) United States Patent
Takahashi et al.

(10) Patent No.: US 10,944,536 B2
(45) Date of Patent: Mar. 9, 2021

(54) TRANSMISSION DEVICE, RECEPTION DEVICE, COMMUNICATION SYSTEM, SIGNAL TRANSMISSION METHOD, SIGNAL RECEPTION METHOD, AND COMMUNICATION METHOD

(71) Applicant: Sony Corporation, Tokyo (JP)

(72) Inventors: Hiroo Takahashi, Kanagawa (JP); Hideyuki Matsumoto, Tokyo (JP); Hiroaki Hayashi, Kanagawa (JP); Naohiro Koshisaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/535,675

(22) Filed: Aug. 8, 2019

(65) Prior Publication Data
US 2020/0127805 A1 Apr. 23, 2020

Related U.S. Application Data

(63) Continuation of application No. 15/573,691, filed as application No. PCT/JP2016/066556 on Jun. 3, 2016, now Pat. No. 10,419,200.

(30) Foreign Application Priority Data

Jun. 15, 2015 (JP) .............................. JP2015-120465
Oct. 19, 2015 (JP) .............................. JP2015-205599

(51) Int. Cl.
*H04L 7/00* (2006.01)
*H04L 25/02* (2006.01)
(Continued)

(52) U.S. Cl.
CPC .............. *H04L 7/0025* (2013.01); *H04L 7/00* (2013.01); *H04L 7/0029* (2013.01); *H04L 7/065* (2013.01); *H04L 25/0272* (2013.01); *H04L 25/38* (2013.01)

(58) Field of Classification Search
CPC .. H04N 7/083–084; G09G 2310/00–08; H04L 7/00; H04L 7/0025; H04L 7/0029; H04L 7/065; H04L 25/0272; H04L 25/38
(Continued)

(56) References Cited

U.S. PATENT DOCUMENTS 5,083,212 A * 1/1992 Owa ...................... H04N 9/81
386/201
5,689,309 A * 11/1997 Nayebi .................. H04N 5/265
348/584
(Continued)

FOREIGN PATENT DOCUMENTS

CN 101662823 A 3/2010
CN 101847134 A 9/2010
(Continued)

OTHER PUBLICATIONS

Extended European Search Report dated Jan. 4, 2019 for corresponding European Application No. 16811462.7.
(Continued)

*Primary Examiner* — James M Perez
(74) *Attorney, Agent, or Firm* — Michael Best & Friedrich LLP

(57) ABSTRACT

A transmission device of the disclosure includes: a clock signal transmitting circuit that outputs a clock signal onto a clock signal line; a data signal transmitting circuit that outputs a data signal onto a data signal line; and a blanking controller that controls the clock signal transmitting circuit to output a predetermined blanking signal, in place of the clock signal, from the clock signal transmitting circuit to the clock signal line in synchronization with a blanking period of the data signal.

13 Claims, 26 Drawing Sheets

(51) Int. Cl.
*H04L 25/38* (2006.01)
*H04L 7/06* (2006.01)

(58) Field of Classification Search
USPC .................................... 375/316, 345, 351
See application file for complete search history.

(56) References Cited

U.S. PATENT DOCUMENTS

| | | | | |
|---|---|---|---|---|
| 5,815,212 | A * | 9/1998 | Edwards | H04N 5/265 348/501 |
| 5,907,367 | A * | 5/1999 | Edwards | H04N 5/265 348/501 |
| 5,974,464 | A * | 10/1999 | Shin | G09G 5/006 709/231 |
| 6,374,393 | B1 * | 4/2002 | Hirairi | G11C 7/1006 716/111 |
| 6,564,269 | B1 * | 5/2003 | Martin | H04N 11/042 710/20 |
| 6,836,290 | B1 * | 12/2004 | Chung | H04N 5/335 348/294 |
| 7,006,583 | B2 * | 2/2006 | Ho | H04B 1/71637 375/136 |
| 7,209,496 | B2 * | 4/2007 | Okamoto | H04N 7/083 348/E7.026 |
| 7,394,499 | B2 * | 7/2008 | Okamoto | H04N 7/083 348/462 |
| 7,519,182 | B2 * | 4/2009 | Shimosato | H04N 7/1675 380/268 |
| 7,522,670 | B2 * | 4/2009 | Carballo | H04L 25/0272 375/257 |
| 7,558,326 | B1 * | 7/2009 | Lyle | H04L 1/0057 348/469 |
| 7,558,336 | B2 * | 7/2009 | Osaka | H03K 5/082 375/226 |
| 7,787,526 | B2 * | 8/2010 | McGee | H04W 52/0235 375/219 |
| 7,907,785 | B2 * | 3/2011 | Fukuhara | H04N 19/80 382/240 |
| 8,050,332 | B2 * | 11/2011 | Chung | H04L 25/0272 375/244 |
| 8,064,535 | B2 * | 11/2011 | Wiley | H04L 25/0294 375/288 |
| 8,774,319 | B2 * | 7/2014 | Nishioka | H04L 25/0272 375/316 |
| 8,843,093 | B2 * | 9/2014 | De Vita | H03K 5/2481 455/222 |
| 8,873,644 | B1 * | 10/2014 | Todsen | H03M 3/368 375/247 |
| 8,938,002 | B2 * | 1/2015 | Matsumoto | H04N 21/4383 375/240.02 |
| 9,088,445 | B2 * | 7/2015 | Chun | G06F 13/4086 |
| 9,172,329 | B2 * | 10/2015 | Ciacci | H03F 3/24 |
| 9,276,592 | B2 * | 3/2016 | Lin | H04L 7/033 |
| 9,503,250 | B2 * | 11/2016 | Van Rens | A61M 25/09 |
| 9,602,317 | B1 * | 3/2017 | Hailu | H03F 3/45183 |
| 10,074,339 | B2 * | 9/2018 | Higashino | G09G 5/006 |
| 10,291,275 | B2 * | 5/2019 | Lee | H04L 25/03878 |
| 10,419,200 | B2 * | 9/2019 | Takahashi | H04L 7/0025 |
| 10,425,124 | B1 * | 9/2019 | Wang | H03F 3/45179 |
| 10,739,812 | B2 * | 8/2020 | Koshisaka | G06F 13/42 |
| 2002/0167972 | A1 * | 11/2002 | Okamoto | H04N 7/083 370/537 |
| 2002/0173090 | A1 * | 11/2002 | Nakada | H04L 25/0278 438/200 |
| 2003/0145336 | A1 * | 7/2003 | Matsuzaki | G09G 5/006 725/136 |
| 2005/0201157 | A1 * | 9/2005 | Honda | G06F 13/4291 365/185.22 |
| 2005/0204057 | A1 * | 9/2005 | Anderson | H04L 65/1069 709/236 |
| 2006/0171477 | A1 * | 8/2006 | Carballo | H04L 25/0292 375/257 |
| 2007/0045659 | A1 * | 3/2007 | Abe | G09G 3/3696 257/152 |
| 2007/0160155 | A1 * | 7/2007 | Choi | H04L 25/085 375/257 |
| 2007/0164883 | A1 * | 7/2007 | Furtner | H04L 25/4908 341/126 |
| 2007/0252622 | A1 * | 11/2007 | Saenz | H04L 25/0292 327/72 |
| 2007/0269122 | A1 * | 11/2007 | Fukuhara | H04N 19/647 382/240 |
| 2008/0018486 | A1 * | 1/2008 | Terasawa | H04L 7/0008 340/636.1 |
| 2008/0165902 | A1 * | 7/2008 | Moriwaki | H04L 25/0292 375/340 |
| 2008/0266463 | A1 * | 10/2008 | Fensore | H03F 1/02 348/726 |
| 2009/0110130 | A1 * | 4/2009 | Boomer | H04B 3/30 375/354 |
| 2010/0007770 | A1 * | 1/2010 | Koganezawa | H04N 5/232 348/231.99 |
| 2010/0265273 | A1 * | 10/2010 | Nishimura | H03F 3/45192 345/690 |
| 2011/0001516 | A1 * | 1/2011 | Hiramatsu | H03K 5/2481 327/65 |
| 2011/0296215 | A1 * | 12/2011 | Mobin | G06F 1/3253 713/323 |
| 2012/0110284 | A1 * | 5/2012 | Matsumoto | H04H 40/90 711/154 |
| 2012/0269522 | A1 * | 10/2012 | Kagaya | H05K 1/0218 398/183 |
| 2013/0241859 | A1 * | 9/2013 | Saitoh | G09G 5/04 345/173 |
| 2013/0265117 | A1 * | 10/2013 | Ng | H04B 15/04 333/26 |
| 2014/0038534 | A1 * | 2/2014 | Ciacci | H03F 3/24 455/108 |
| 2014/0152340 | A1 * | 6/2014 | Cho | G06F 13/16 326/30 |
| 2014/0240604 | A1 * | 8/2014 | Toba | G09G 5/006 348/723 |
| 2014/0241465 | A1 * | 8/2014 | Itoigawa | H04L 25/0272 375/316 |
| 2015/0043674 | A1 * | 2/2015 | Blon | H04W 52/0209 375/295 |
| 2015/0043690 | A1 * | 2/2015 | Blon | H04B 1/04 375/354 |
| 2015/0043691 | A1 * | 2/2015 | Blon | H04L 25/0272 375/354 |
| 2015/0062110 | A1 * | 3/2015 | Oh | G09G 5/18 345/213 |
| 2015/0089265 | A1 * | 3/2015 | Kamizuma | G06F 1/12 713/323 |
| 2015/0262547 | A1 * | 9/2015 | Higashino | G09G 5/006 345/58 |
| 2015/0310822 | A1 * | 10/2015 | Saeki | G09G 3/3688 345/213 |
| 2015/0318030 | A1 * | 11/2015 | Wilson | G11C 7/1072 711/106 |
| 2015/0325166 | A1 * | 11/2015 | Lee | G09G 3/2092 345/214 |
| 2016/0247473 | A1 * | 8/2016 | Matsuda | G09G 3/20 |
| 2018/0145822 | A1 * | 5/2018 | Takahashi | H04L 7/0029 |
| 2018/0321705 | A1 * | 11/2018 | Koshisaka | H04L 25/00 |
| 2018/0350411 | A1 * | 12/2018 | Ware | G11C 29/023 |
| 2019/0288743 | A1 * | 9/2019 | Wang | H04B 3/36 |
| 2020/0127805 | A1 * | 4/2020 | Takahashi | H04L 25/0272 |
| 2020/0304281 | A1 * | 9/2020 | Takahashi | H04L 7/0008 |

FOREIGN PATENT DOCUMENTS

| | | |
|---|---|---|
| CN | 101944900 A | 1/2011 |
| JP | 06-053964 A | 2/1994 |
| JP | 2007-282186 A | 10/2007 |

(56) References Cited

FOREIGN PATENT DOCUMENTS

| JP | 2011-015328 A | 1/2011 |
|----|---------------|--------|
| JP | 2014-522204 A | 8/2014 |

OTHER PUBLICATIONS

Besten et al., "D-Phy Tutorial", copyright Jan. 1, 2005, MIPI Alliance Confidential, Retrieved from the Internet Mar. 28, 2013; URL:http://www.mpi.org.

Intellectual Property Office of Singapore Invitation to Response to Written Opinion dated Aug. 20, 2018 in corresponding Application No. 11201708831W.

Japanese Office Action dated Apr. 28, 2020 for corresponding Japanese Application No. 2017-524818.

Chinese Office Action dated Jun. 15, 2020 for corresponding Chinese Application No. 201680033258.9.

* cited by examiner

[FIG. 1]
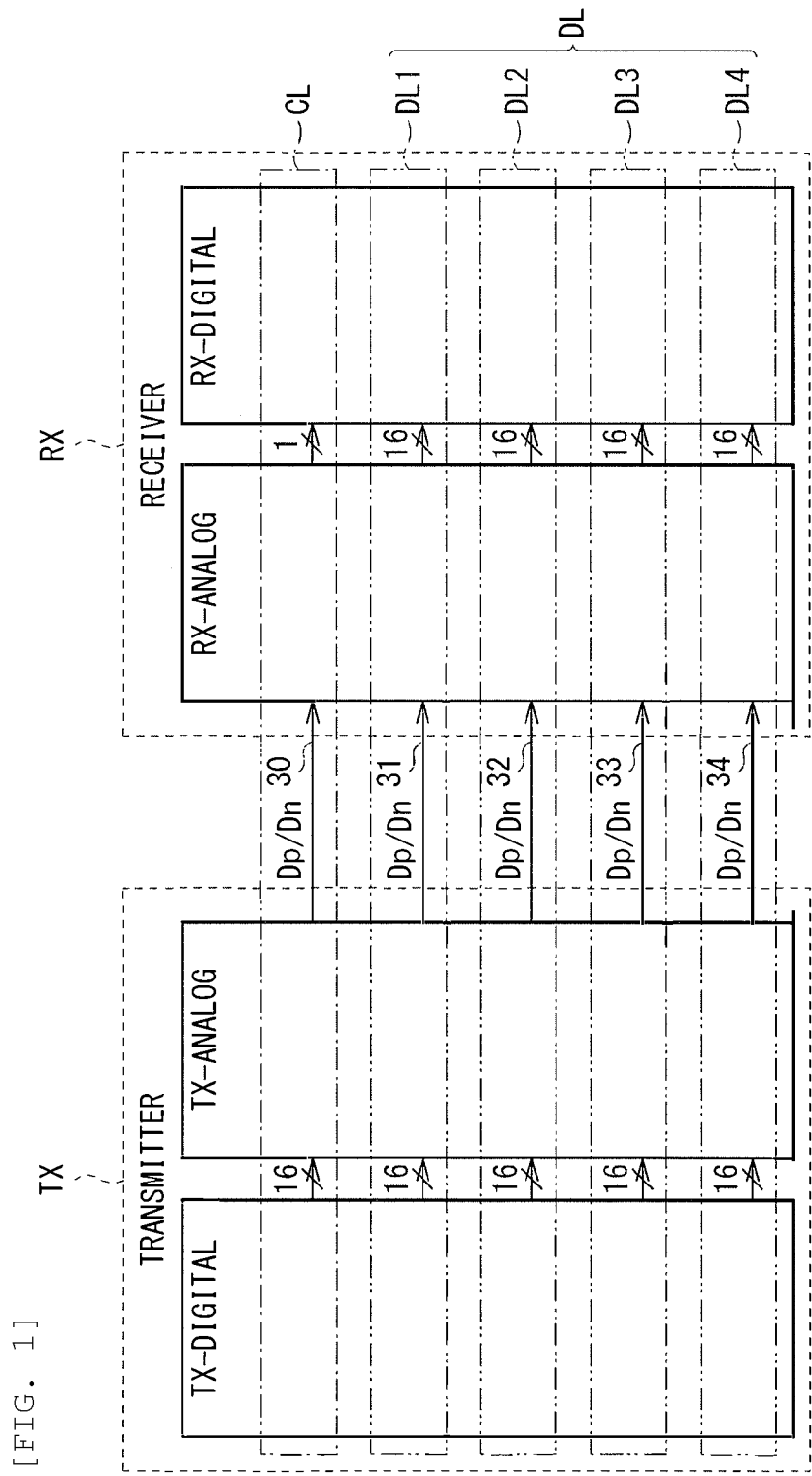

[FIG. 2]
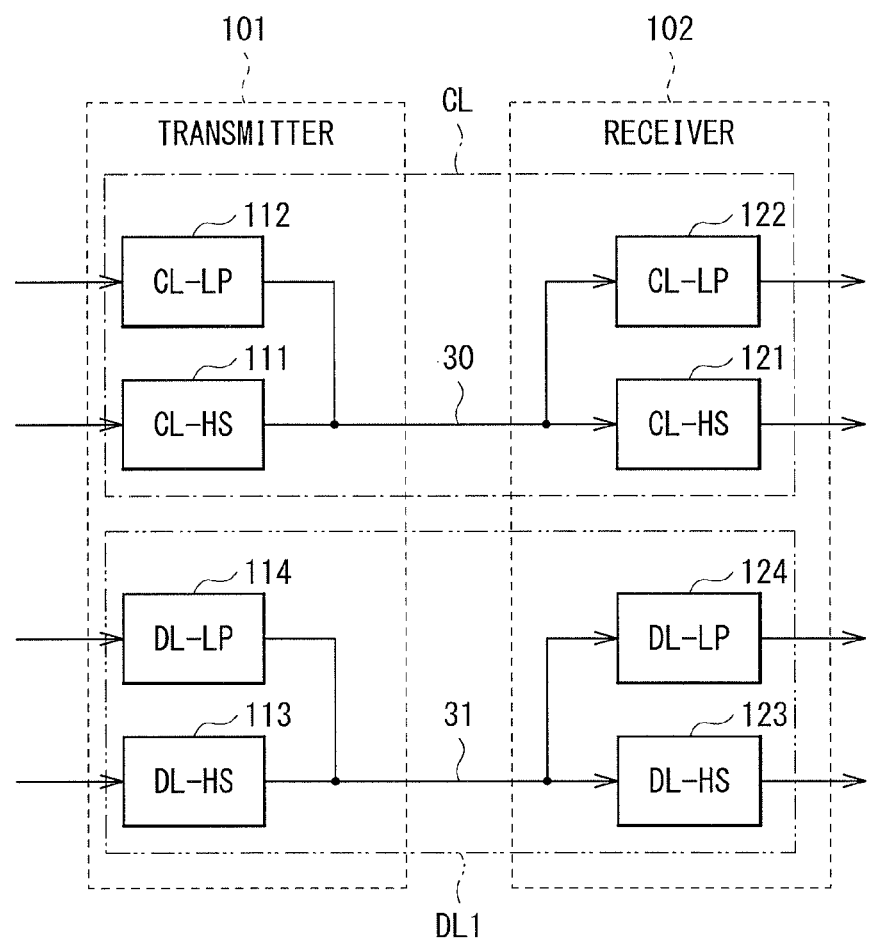

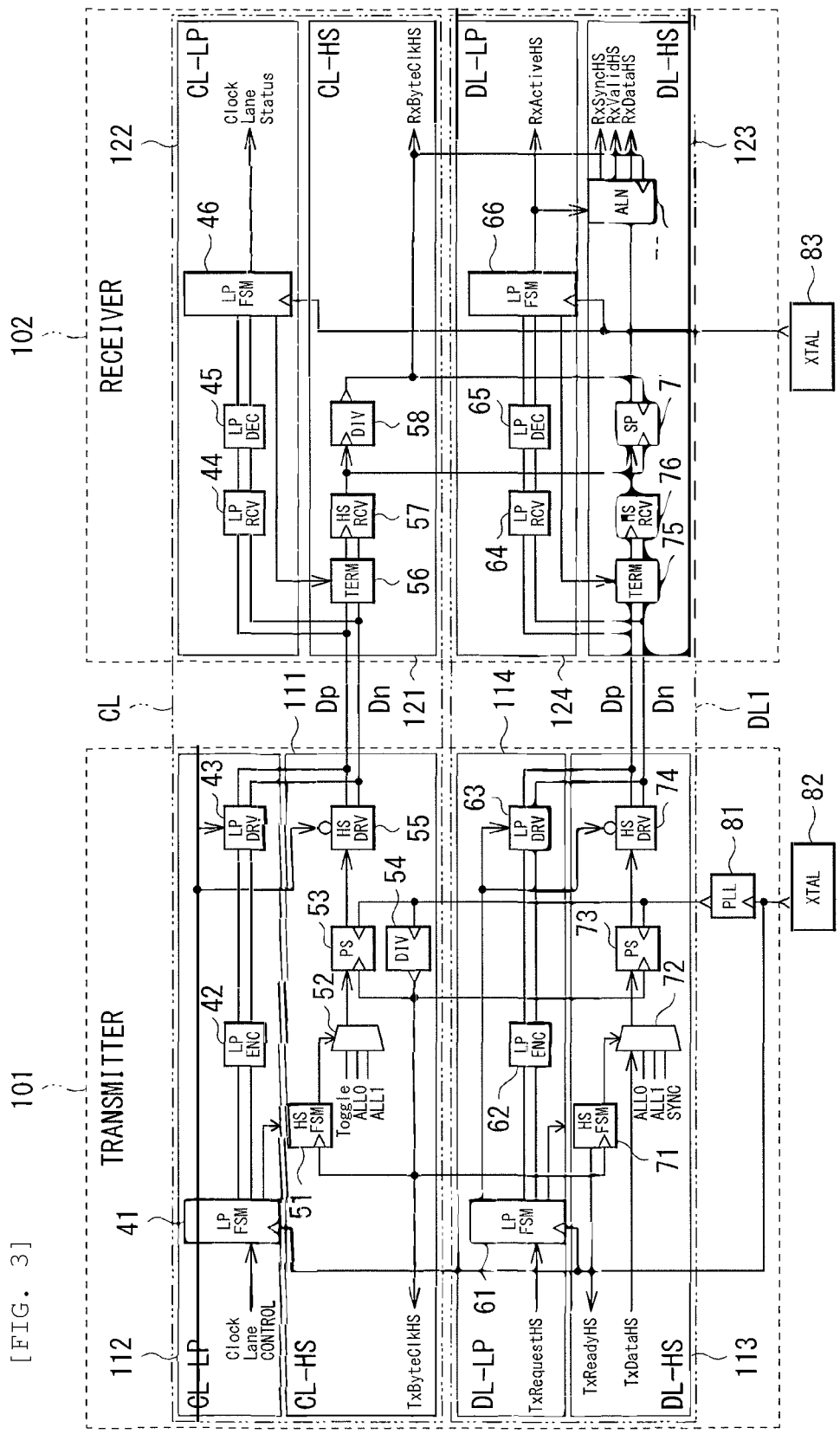
[FIG. 3]

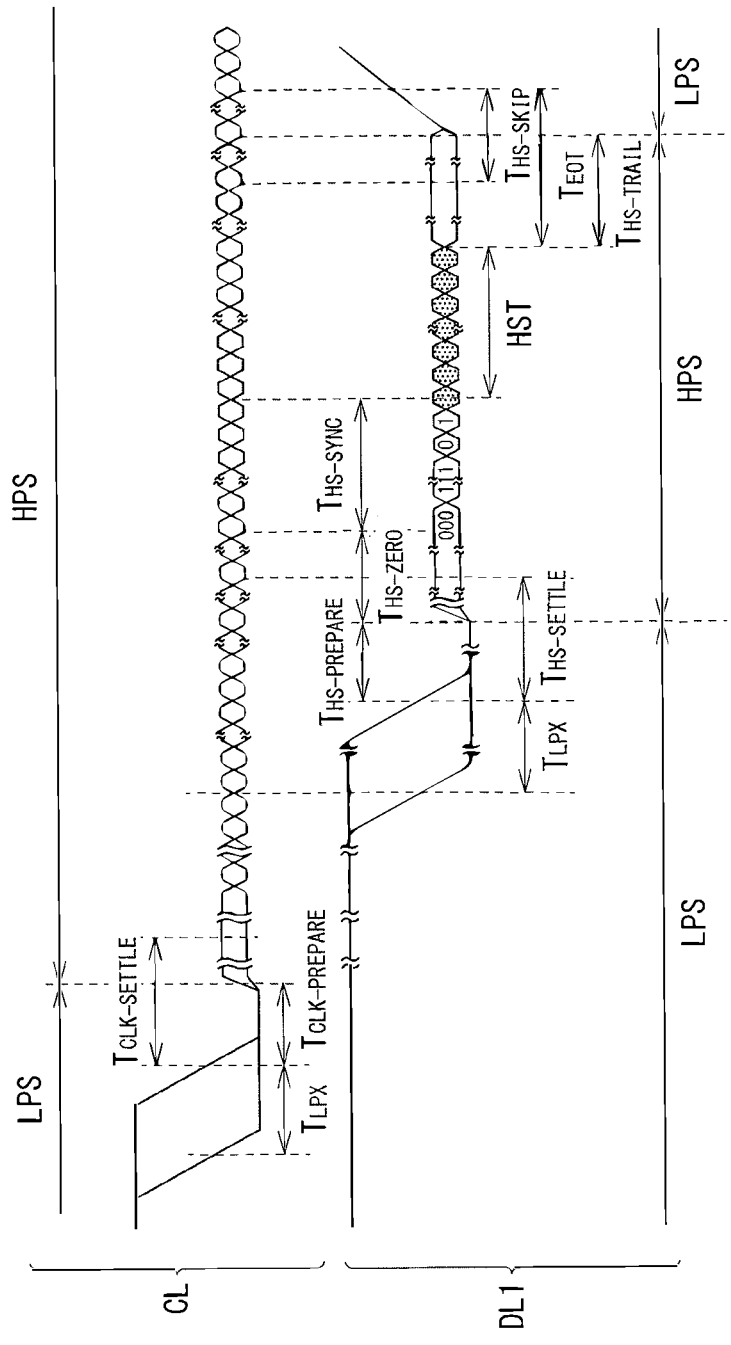
[FIG. 4]

[ FIG. 5 ]
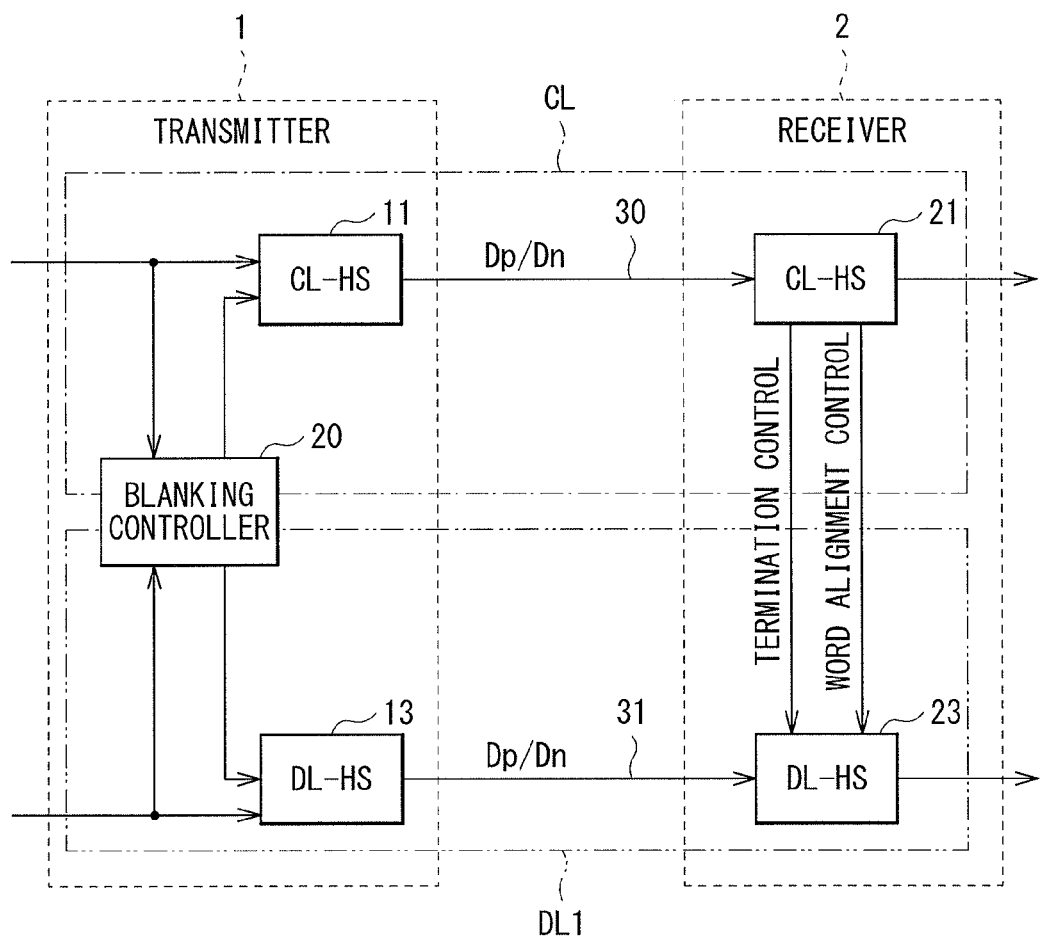

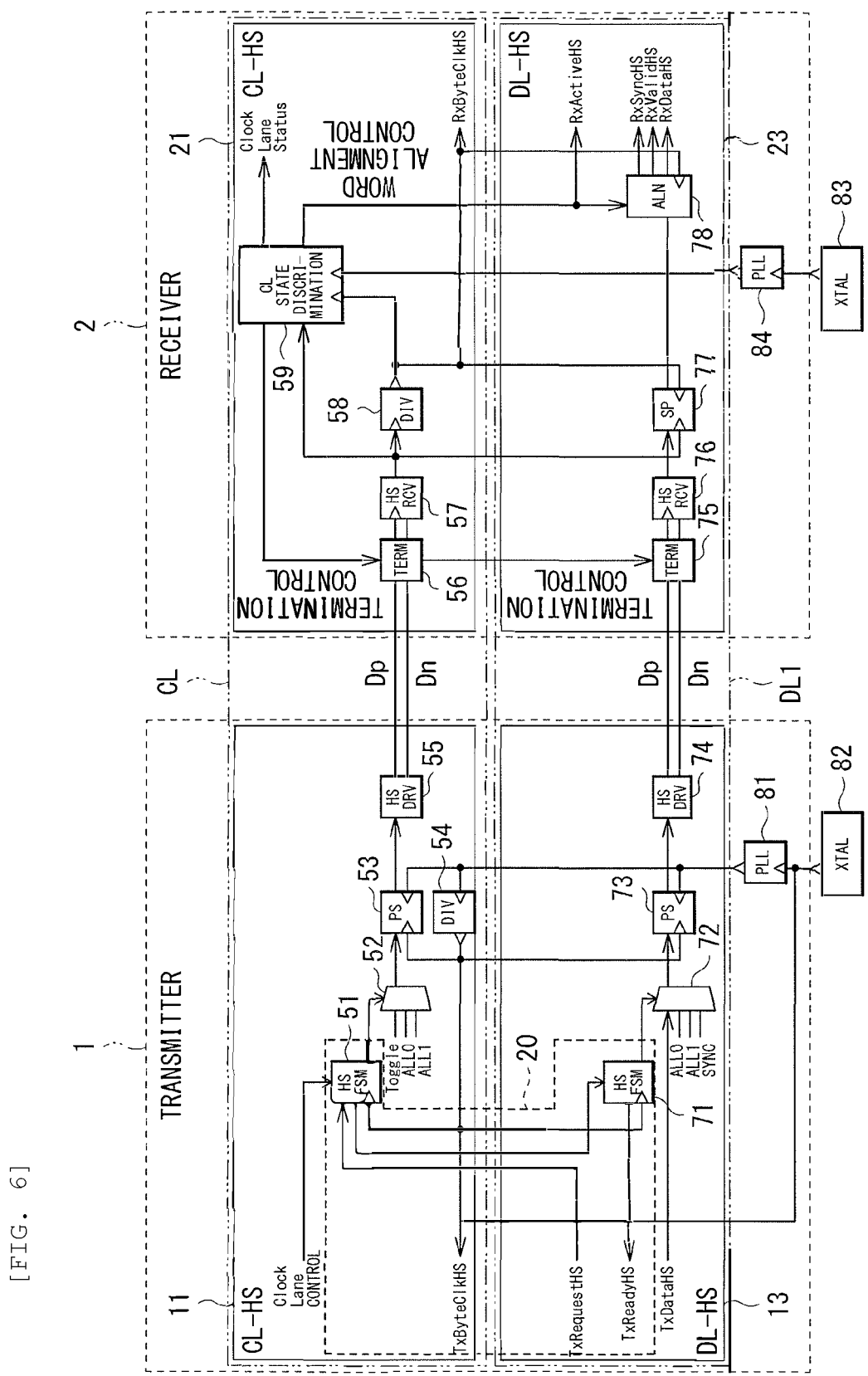
[FIG. 6]

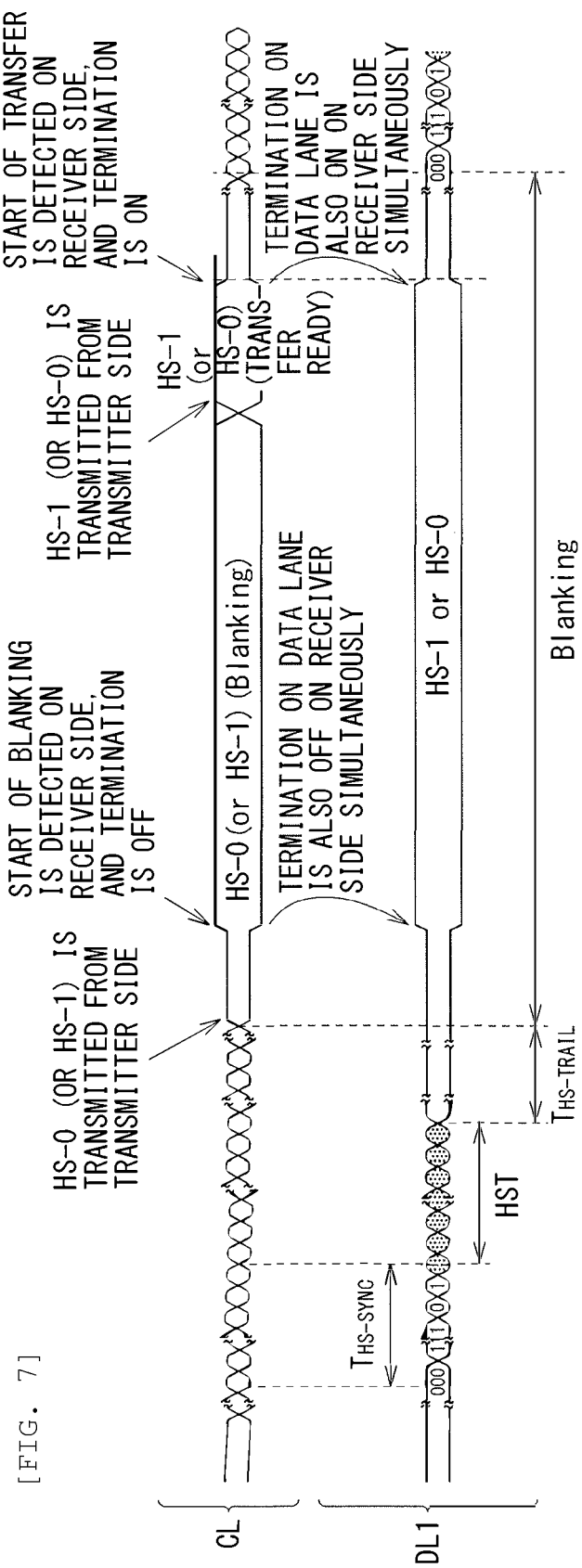

[ FIG. 8 ]

| State Code | Line Voltage Levels | | High-Speed Burst Mode |
|---|---|---|---|
| | Dp-Line | Dn-Line | |
| HS-0 | HS Low | HS High | Differential-0 |
| HS-1 | HS High | HS Low | Differential-1 |

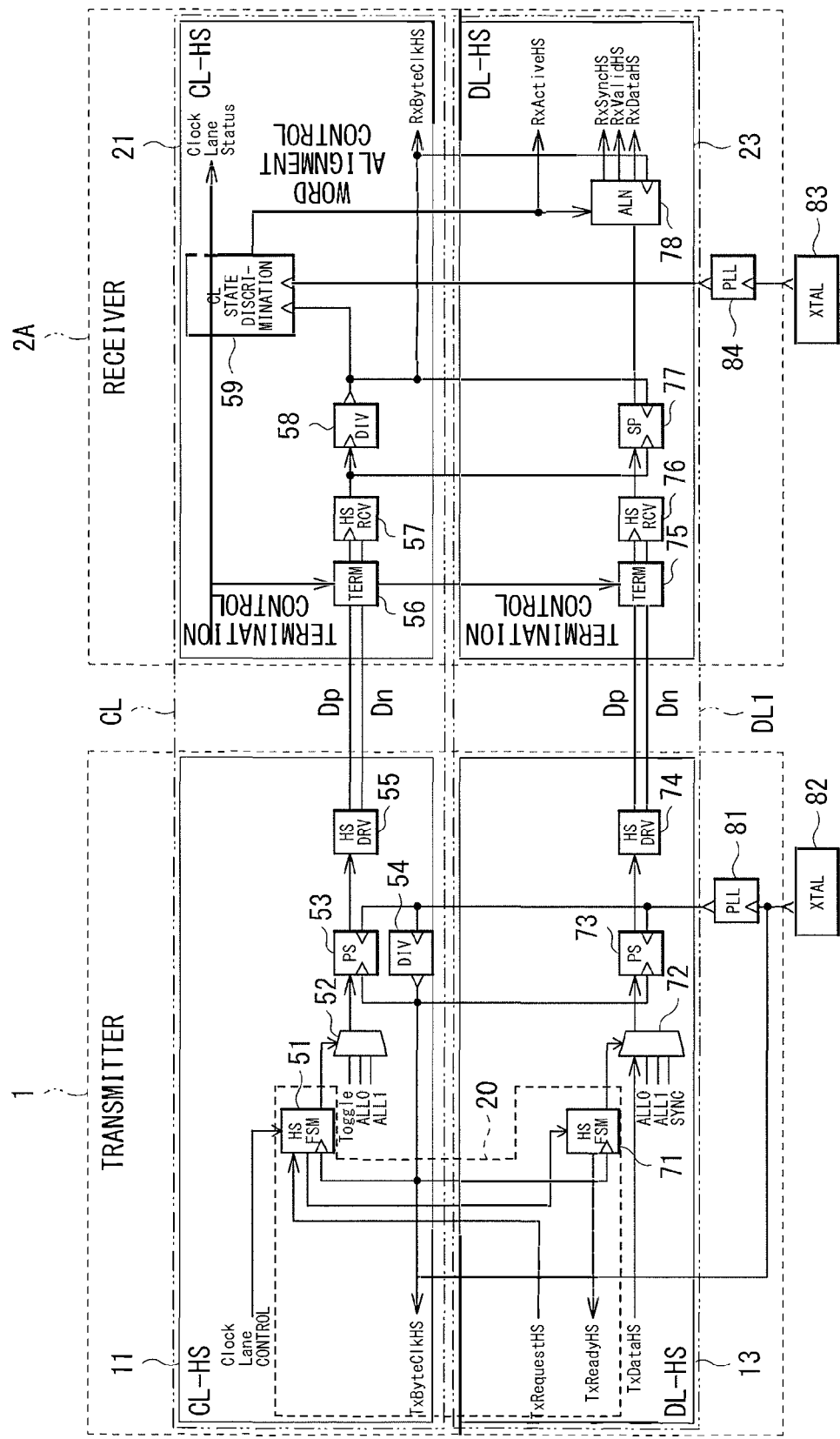
[FIG. 9]

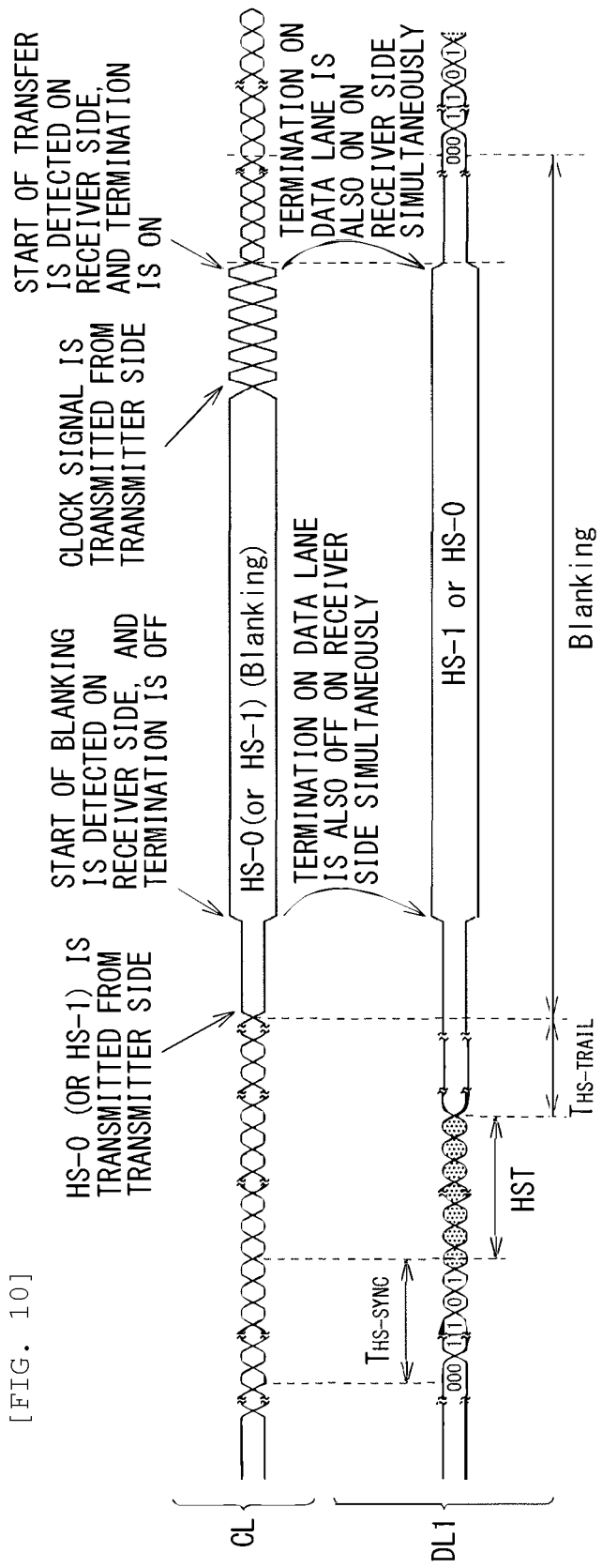
[FIG. 10]

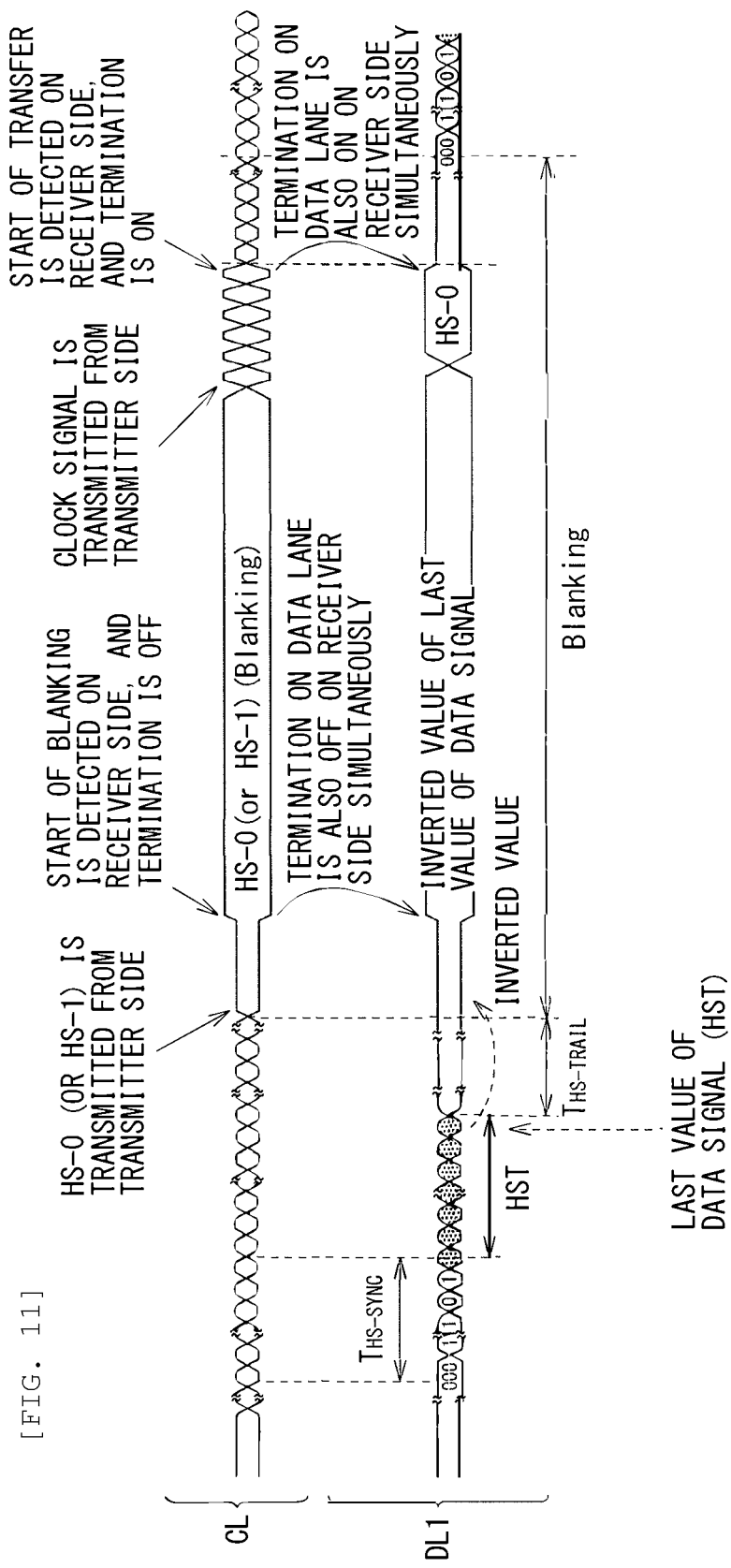
[FIG. 11]

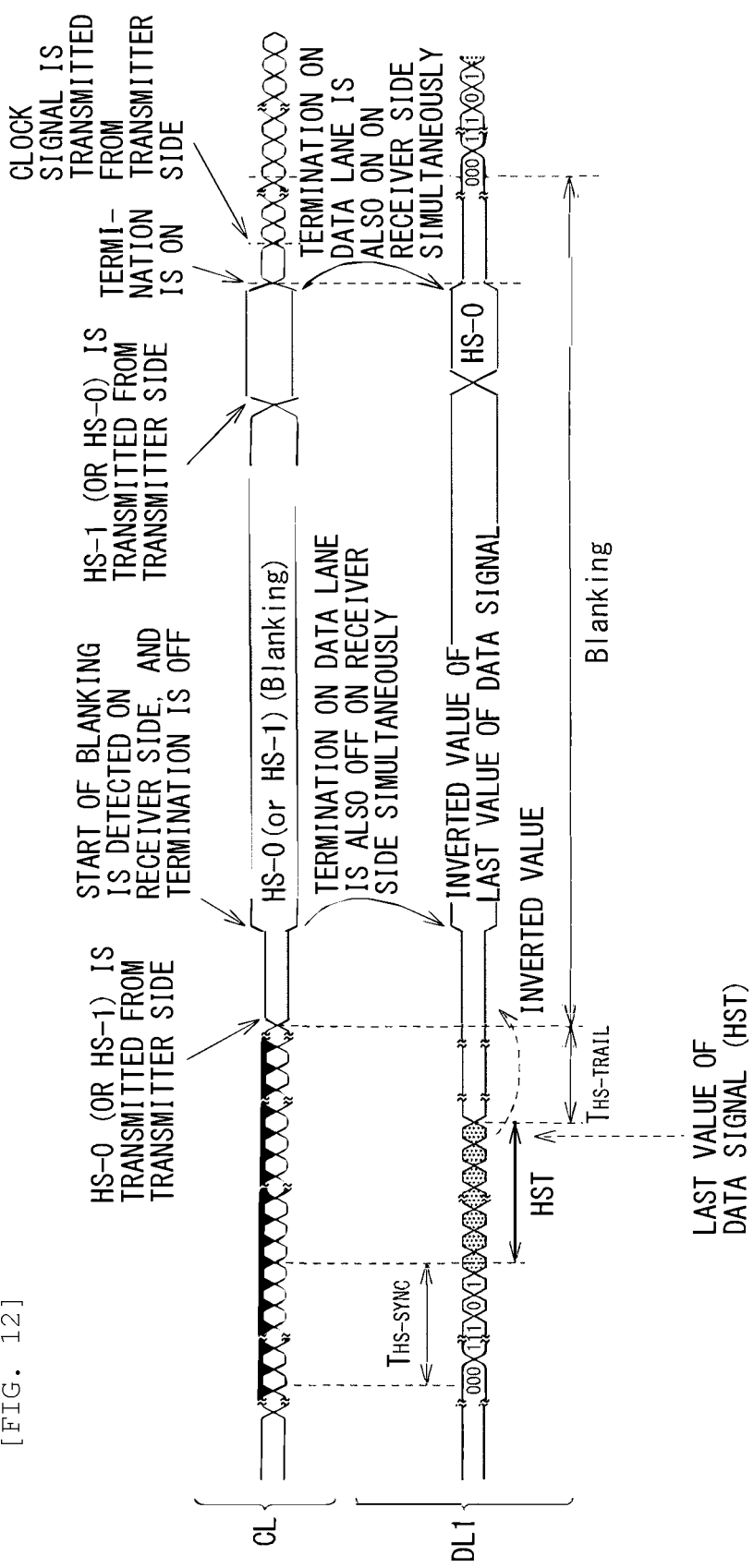
[FIG. 12]

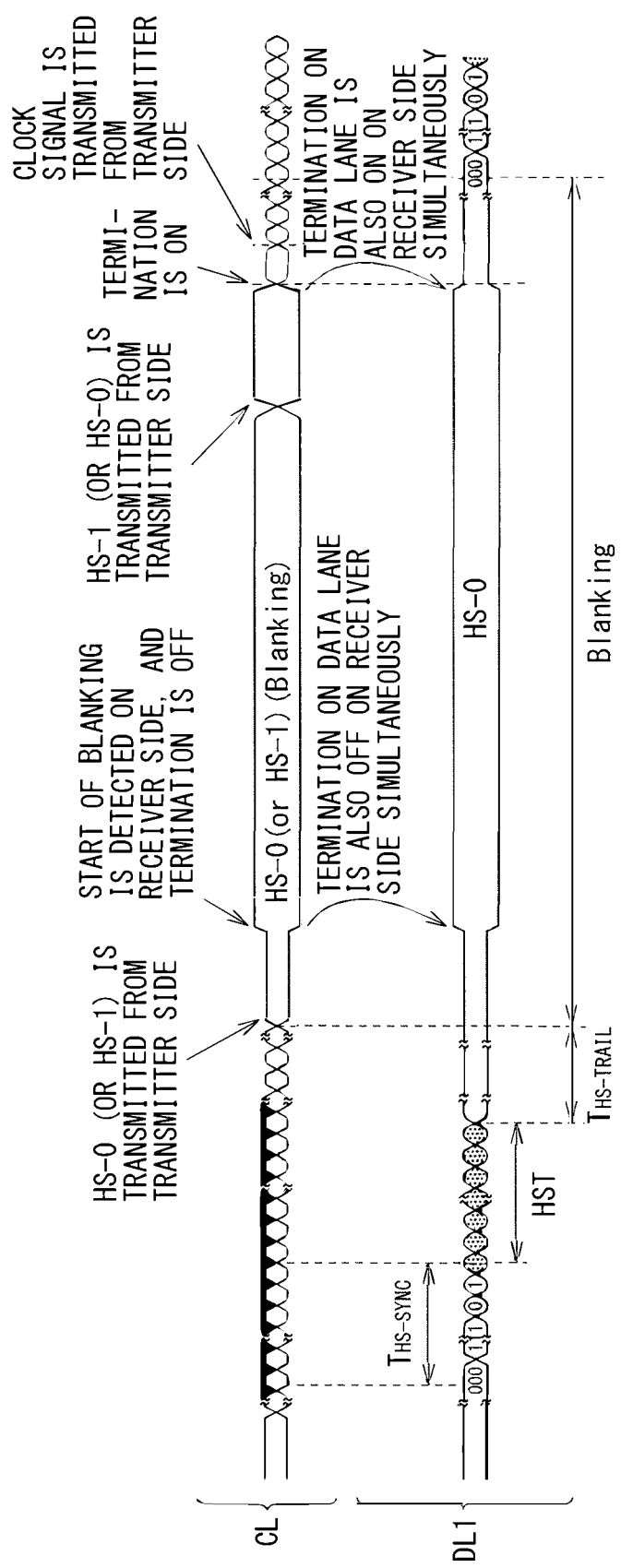
[FIG. 13]

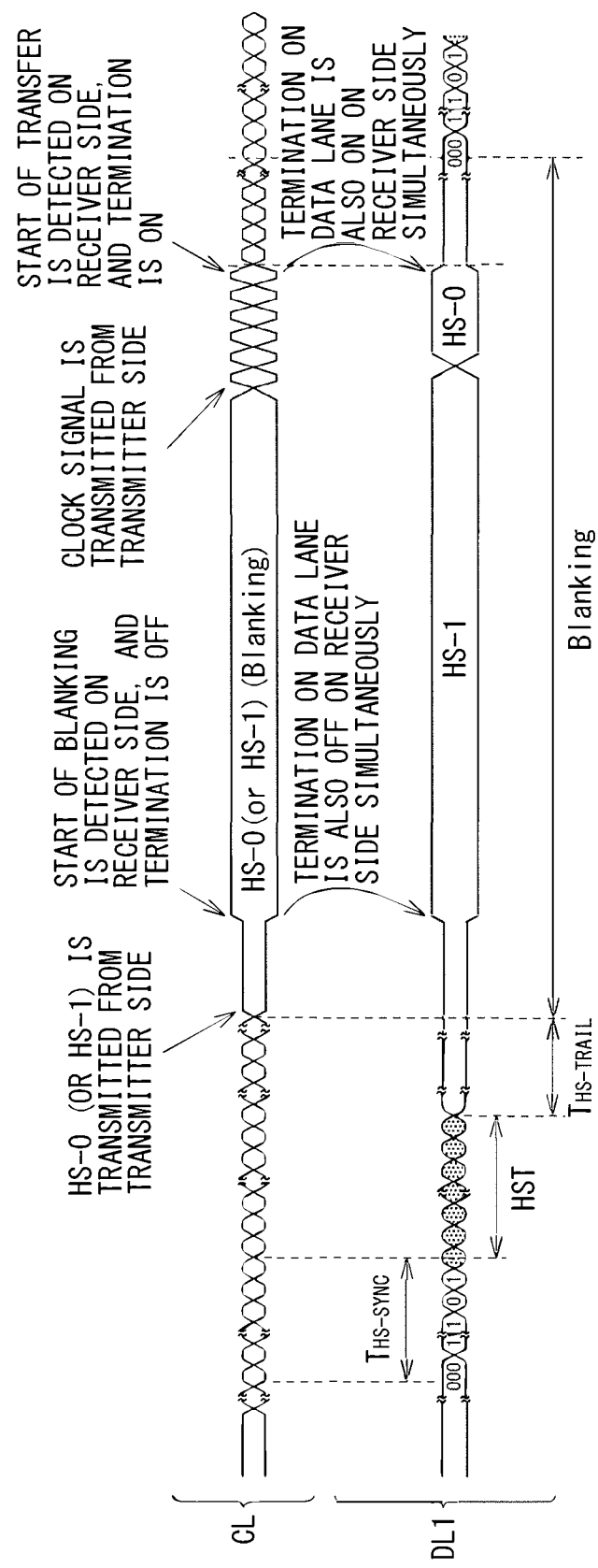
[FIG. 14]

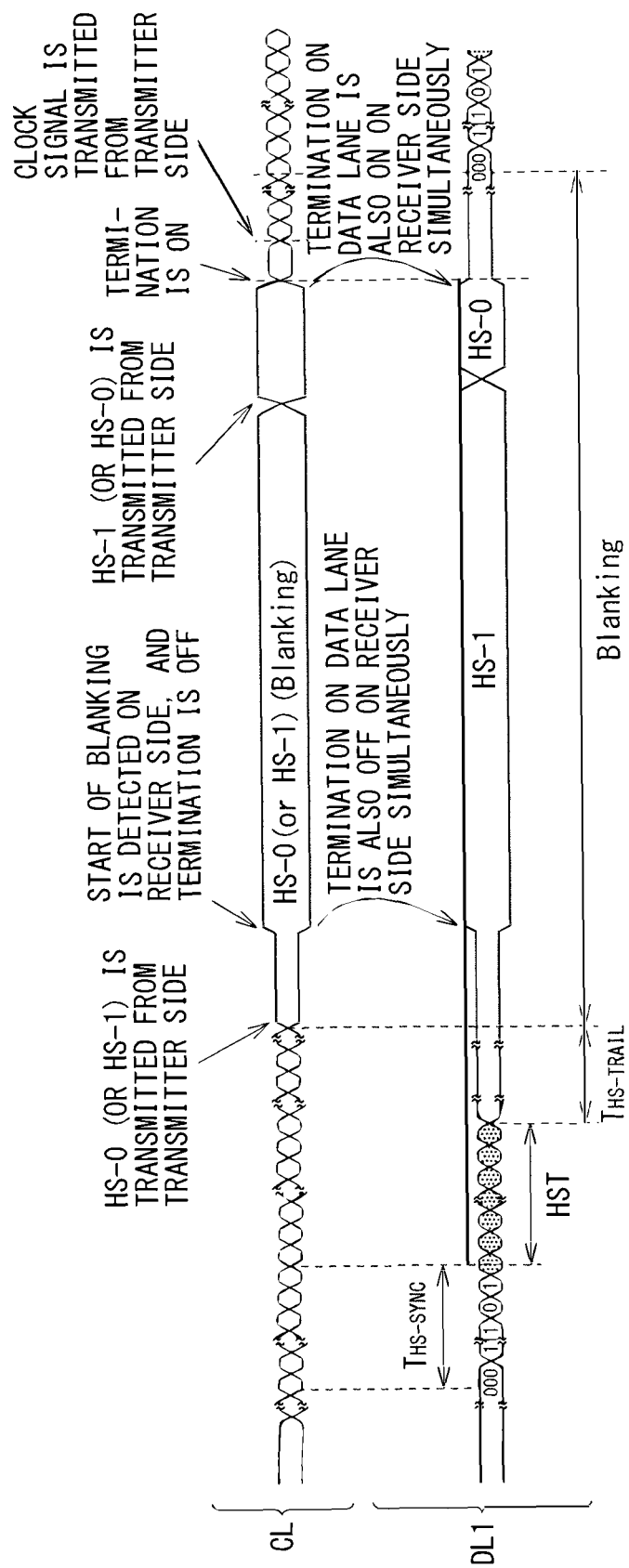
[FIG. 15]

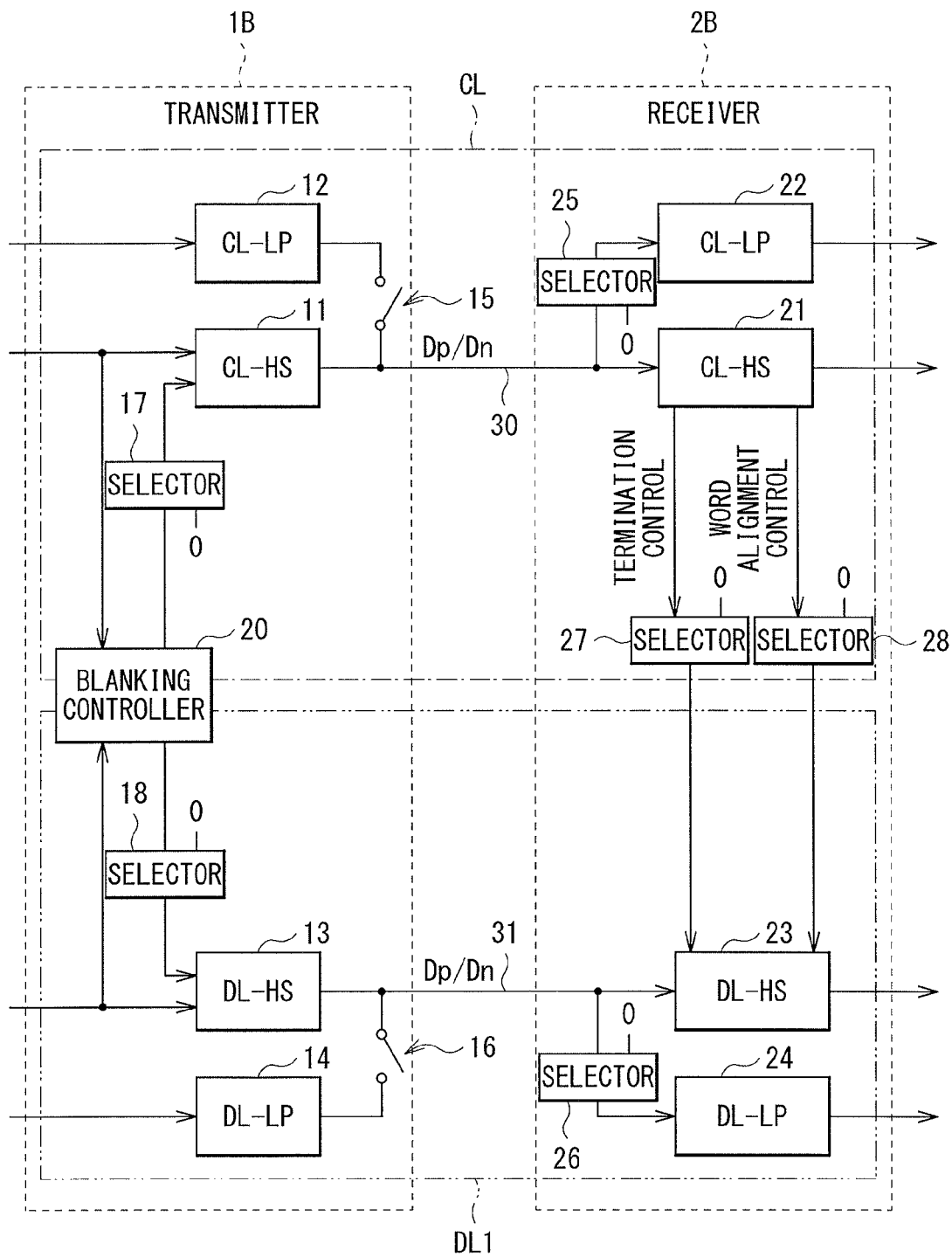
[FIG.16]

[ FIG. 17 ]
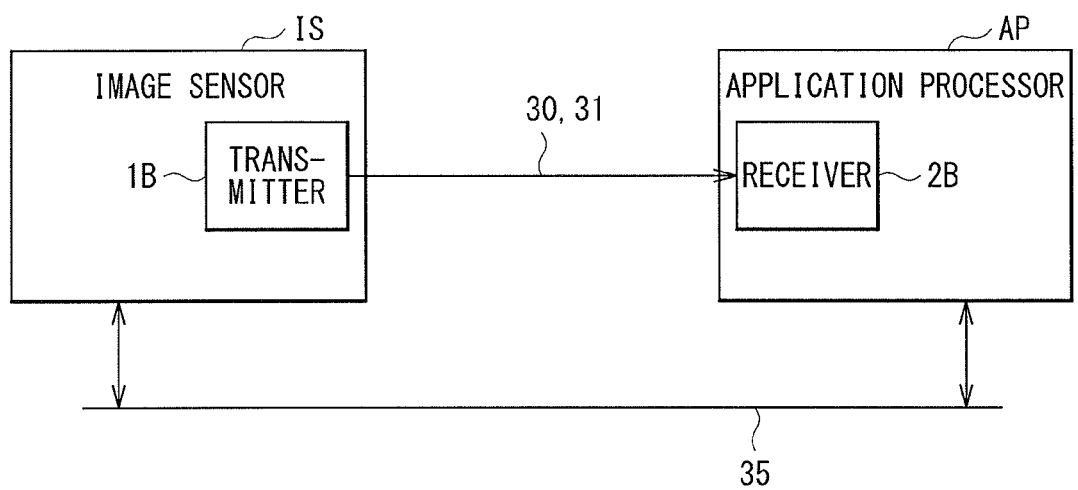

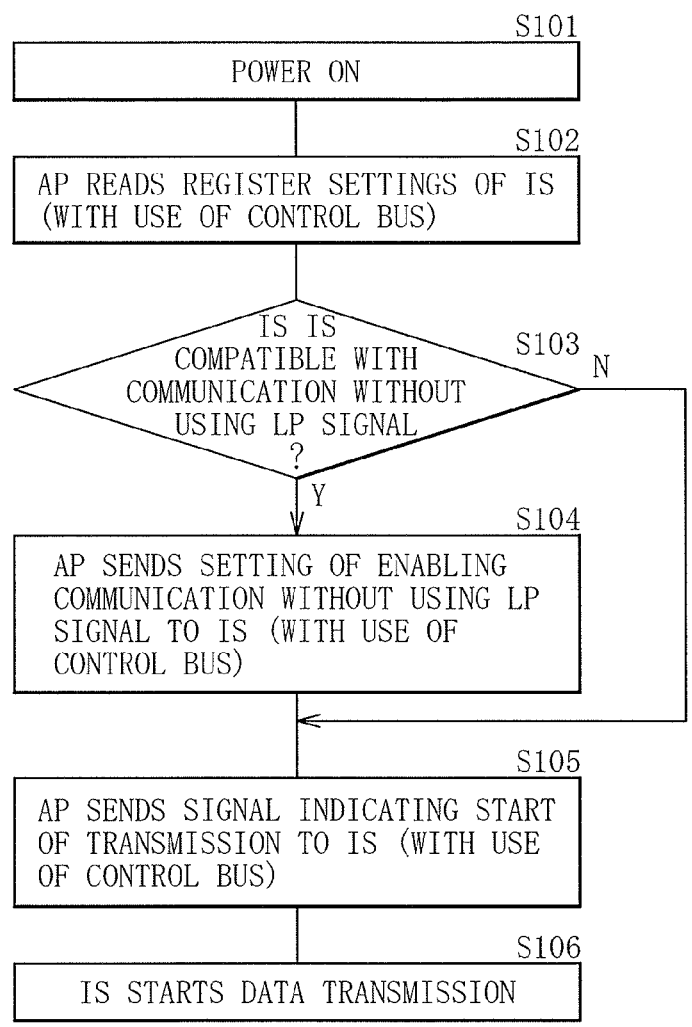
[ FIG. 18 ]

[ FIG. 19 ]
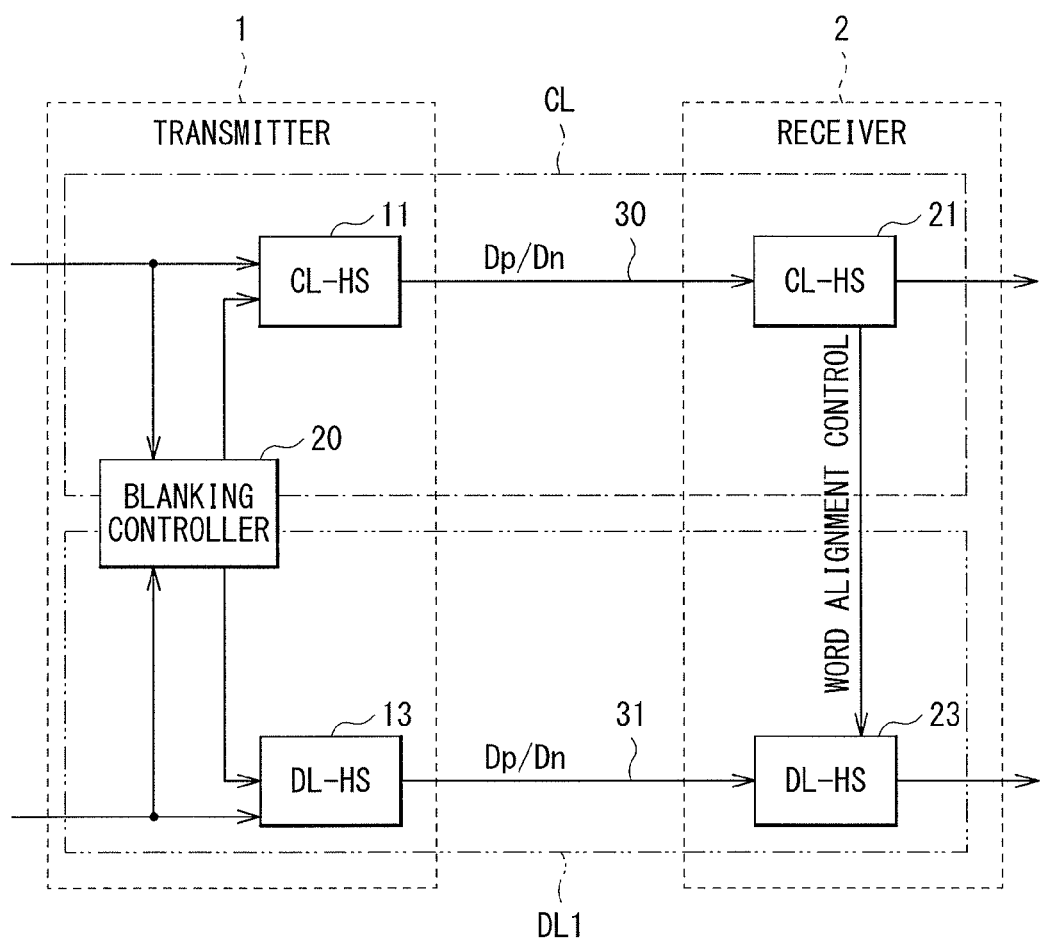

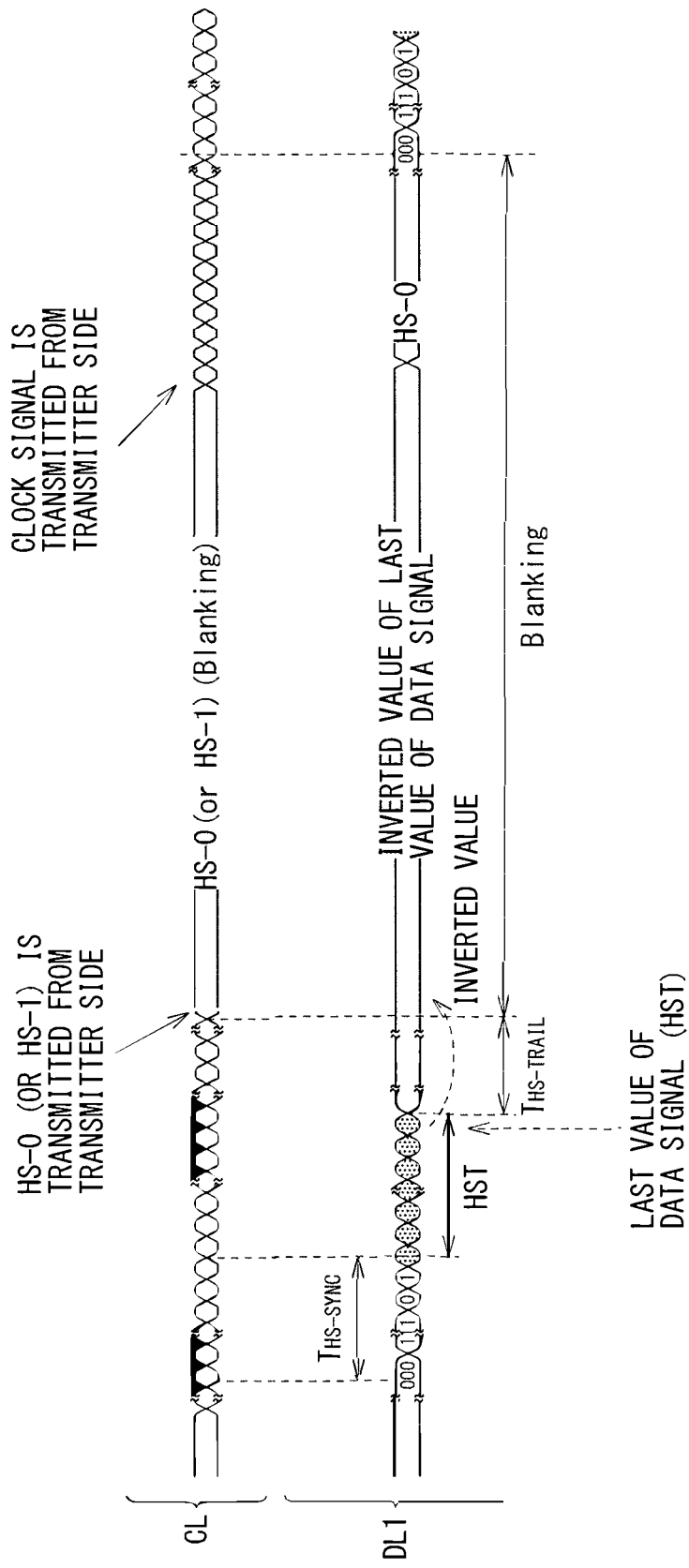
[FIG. 20]

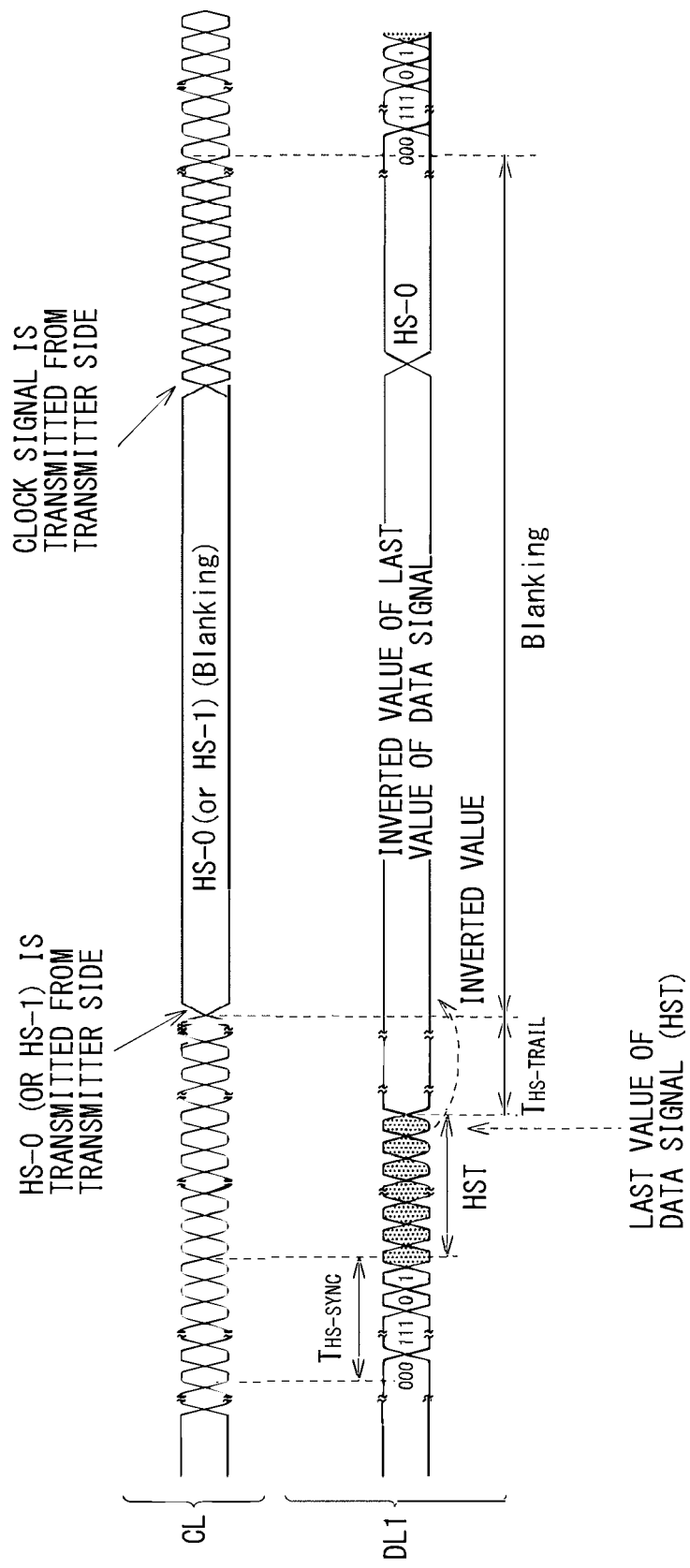
[FIG. 21]

[ FIG. 22 ]
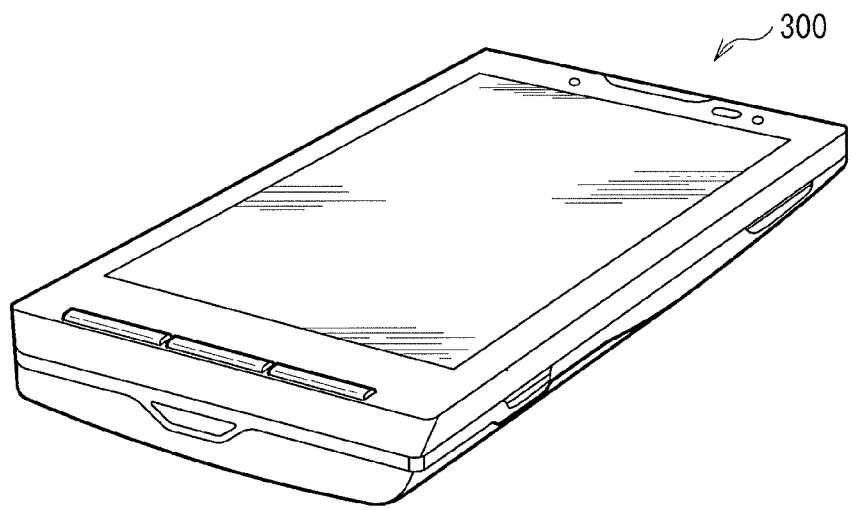

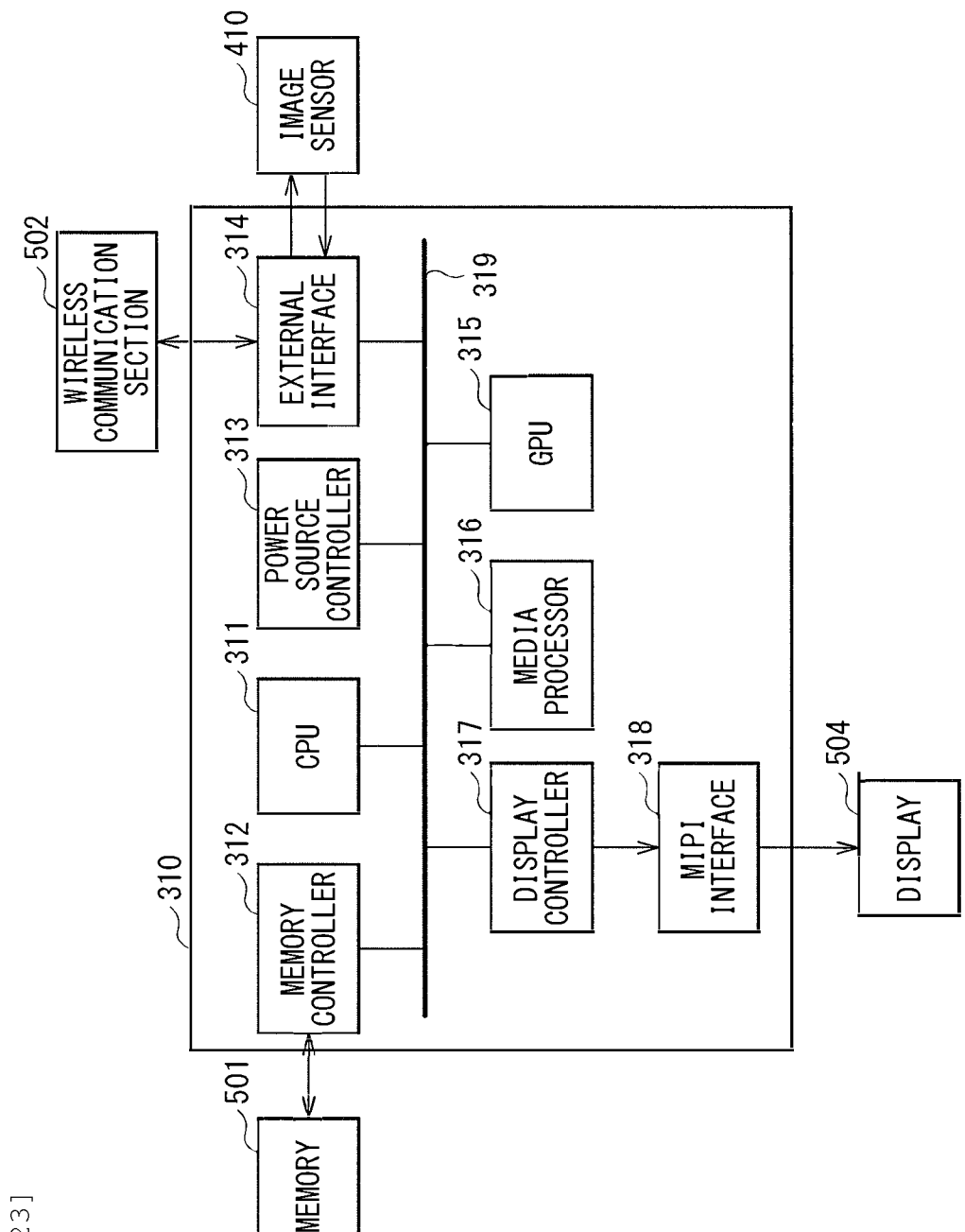
[FIG. 23]

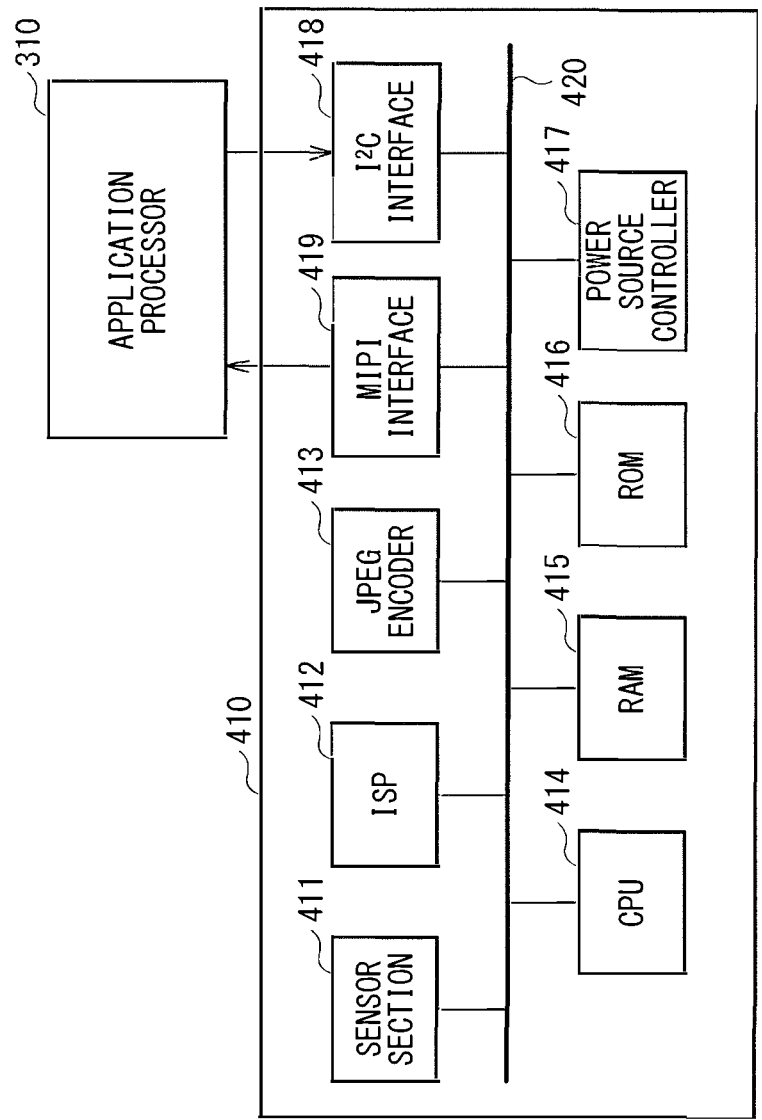
[FIG. 24]

[ FIG. 25 ]
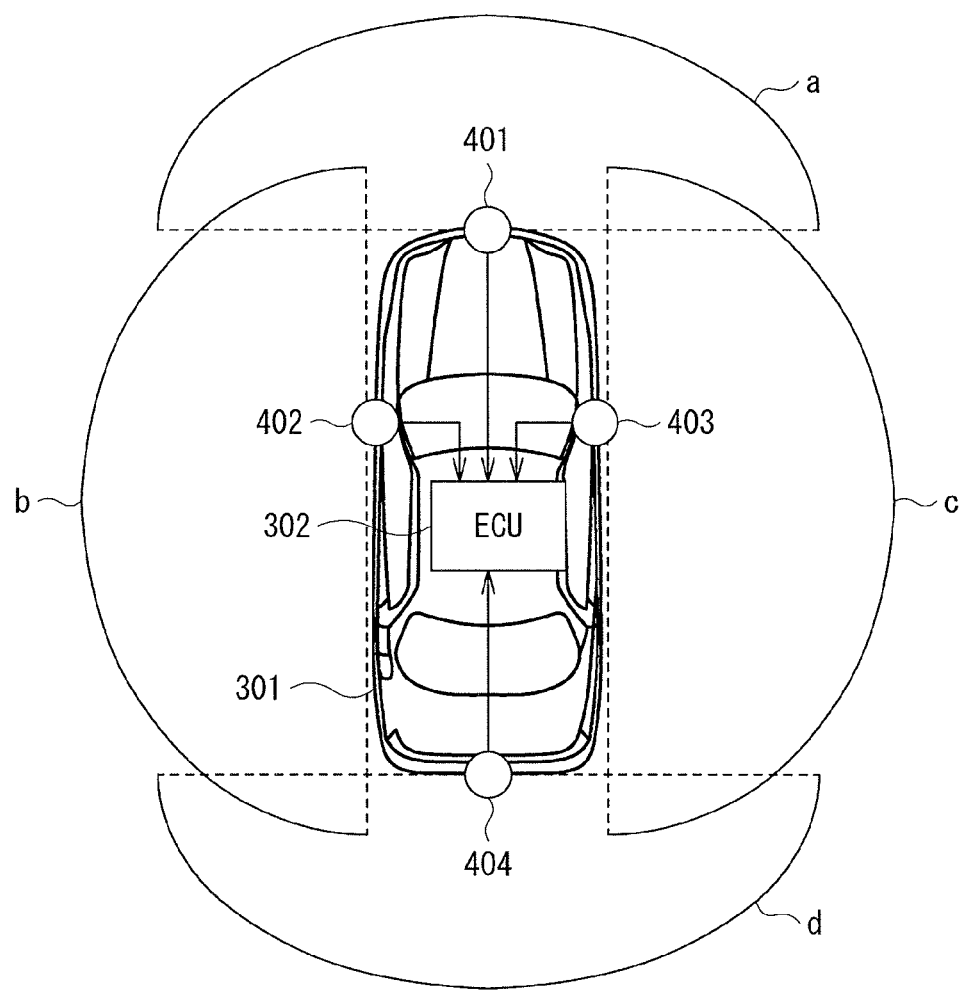

[ FIG. 26 ]
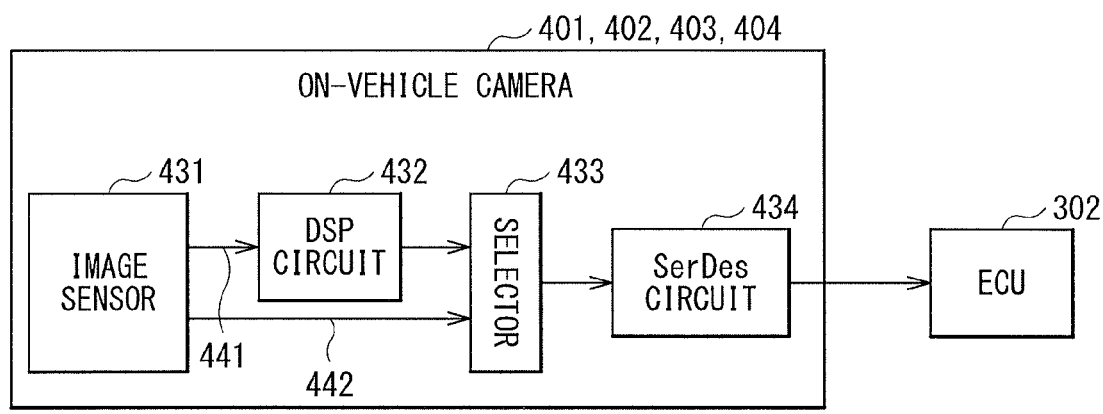

TRANSMISSION DEVICE, RECEPTION DEVICE, COMMUNICATION SYSTEM, SIGNAL TRANSMISSION METHOD, SIGNAL RECEPTION METHOD, AND COMMUNICATION METHOD

CROSS REFERENCES TO RELATED APPLICATIONS

The present invention is a Continuation of application Ser. No. 15/573,691, filed Nov. 13, 2017, which is a 371 National Stage Entry of International Application No. PCT/JP2016/066556, filed on Jun. 3, 2016, which in turn claims the priority of Japanese Patent Application No. 2015-120465 filed on Jun. 15, 2015 and Japanese Patent Application No. 2015-205599 filed on Oct. 19, 2015, the entire contents of which are incorporated in this application by reference.

TECHNICAL FIELD

The disclosure relates to a transmission device, a reception device, a communication system, a signal transmission method, a signal reception method, and a communication method that are all applicable to transmission of data signals and clock signals.

BACKGROUND ART

In recent years, the larger-capacity image data has been increasingly handled in a mobile device such as a smartphone, and a camera device, and high-speed performance and low power consumption have been desired for data transmission within a single device or among different devices. To meet such requirements, as connection interfaces intended for the mobile device and the camera device, standardization of the high-speed interface standards such as the C-PHY standard and the D-PHY standard that have been developed by the MIPI (Mobile Industry Processor Interface) alliance has been promoted. The C-PHY standard and the D-PHY standard are interface specifications of a physical layer (Physical Layer: PHY) of a communication protocol. Further, as higher-level protocol layers of the C-PHY standard and the D-PHY standard, a DSI (Display Serial Interface) for a display built into a mobile device, and a CSI (Camera Serial Interface) for a camera device are currently available. PTL 1 proposes a technology that attempts to stabilize signal transmission in accordance with the D-PHY standard.

CITATION LIST

Patent Literature

PTL 1: Japanese Unexamined Patent Application Publication (Published Japanese Translation of PCT Application) No. JP2014-522204

SUMMARY OF THE INVENTION

In the C-PHY standard and the D-PHY standard as described above, a high-speed (HS) differential signal is used for transmission of a substantial data signal. Further, in a blanking period of a clock signal and a data signal, a low-power (LP) signal is used. The HS differential signal and the LP signal are transmitted through a common transmission path. For example, in the D-PHY standard, there exist a single transmission path (a clock lane) through which the clock signal is transmitted, and one or more transmission paths (data lanes) through which the data signal is transmitted. A signal transmission period in each of the clock lane and the data lane has a period of transmission with use of the HS differential signal and a period of transmission with use of the LP signal. In each of the clock lane and the data lane, the HS differential signal and the LP signal are transmitted through the common transmission path. However, the LP signal is not a differential signal, but a single-end signal, and a voltage value demanded for signal transmission is different from a voltage value for the HS differential signal. As a result, this necessitates separate circuits for transmission and reception of each of the HS differential signal and the LP signal.

It is therefore desirable to provide a transmission device, a reception device, a communication system, a signal transmission method, a signal reception method, and a communication method that are all able to reduce power consumption for data transmission.

A transmission device according to an embodiment of the disclosure includes: a clock signal transmitting circuit that outputs a clock signal onto a clock signal line; a data signal transmitting circuit that outputs a data signal onto a data signal line; and a blanking controller that controls the clock signal transmitting circuit to output a predetermined blanking signal, in place of the clock signal, from the clock signal transmitting circuit to the clock signal line in synchronization with a blanking period of the data signal.

A reception device according to an embodiment of the disclosure includes: a data signal receiving circuit that receives a data signal through a data signal line; and a clock signal receiving circuit that receives a clock signal and a predetermined blanking signal that is outputted in synchronization with a blanking period of the data signal through a clock signal line.

A communication system according to an embodiment of the disclosure includes: a transmission device that outputs a clock signal onto a clock signal line, outputs a data signal onto a data signal line, and outputs a predetermined blanking signal in place of the clock signal in synchronization with a blanking period of the data signal; and a reception device that receives the data signal through the data signal line, and receives the clock signal and the predetermined blanking signal through the clock signal line.

A signal transmission method according to an embodiment of the disclosure includes: outputting a clock signal onto a clock signal line; outputting a data signal onto a data signal line; and outputting a predetermined blanking signal, in place of the clock signal, onto the clock signal line in synchronization with a blanking period of the data signal.

A signal reception method according to an embodiment of the disclosure includes: receiving a data signal through a data signal line; and receiving a clock signal and a predetermined blanking signal that is outputted in synchronization with a blanking period of the data signal through a clock signal line.

A communication method according to an embodiment of the disclosure includes: outputting a clock signal onto a clock signal line; outputting a data signal onto a data signal line; outputting a predetermined blanking signal, in place of the clock signal, onto the clock signal line in synchronization with a blanking period of the data signal; receiving the data signal through the data signal line; and receiving the clock signal and the predetermined blanking signal through the clock signal line.

In the transmission device or the communication system, or the signal transmission method or the communication method according to the embodiment of the disclosure, the predetermined blanking signal is outputted in place of the clock signal onto the clock signal line in synchronization with the blanking period of the data signal.

In the reception device or the communication system, or the signal reception method or the communication method according to the embodiment of the disclosure, the clock signal and the predetermined blanking signal that is outputted in synchronization with the blanking period of the data signal are received through the clock signal line.

According to the transmission device or the communication system, or the signal transmission method or the communication method of the embodiment of the disclosure, the predetermined blanking signal is outputted in place of the clock signal onto the clock signal line in synchronization with the blanking period of the data signal, which makes it possible to reduce power consumption for data transmission.

According to the reception device or the communication system, or the signal reception method or the communication method of the embodiment of the disclosure, the clock signal and the predetermined blanking signal that is outputted in synchronization with the blanking period of the data signal are received through the clock signal line, which makes it possible to reduce power consumption for data transmission.

It is to be noted that the effects of the disclosure are not necessarily limited to the effects described here, and may be one or more of effects described in the disclosure.

BRIEF DESCRIPTION OF DRAWINGS

FIG. 1 is a block diagram illustrating an overview of a communication system that transmits data signals and clock signals.

FIG. 2 is a block diagram illustrating a configuration example of a communication system according to a comparative example that achieves the communication system illustrated in FIG. 1.

FIG. 3 is a circuit diagram illustrating a specific circuit configuration example of the communication system illustrated in FIG. 2.

FIG. 4 is an explanatory diagram illustrating an example of a signal waveform of each of signals to be transmitted on a clock lane and a data lane in the communication system illustrated in FIG. 2.

FIG. 5 is a block diagram illustrating an overview of a communication system according to a first embodiment of the disclosure.

FIG. 6 is a circuit diagram illustrating a specific circuit configuration example of the communication system illustrated in FIG. 5.

FIG. 7 is an explanatory diagram illustrating an example of a signal waveform of each of signals to be transmitted on a clock lane and a data lane in the communication system illustrated in FIG. 5.

FIG. 8 is an explanatory diagram concerning a differential signal.

FIG. 9 is a circuit diagram illustrating a specific circuit configuration example of a communication system according to a second embodiment.

FIG. 10 is an explanatory diagram illustrating an example of a signal waveform of each of signals to be transmitted on a clock lane and a data lane in the communication system illustrated in FIG. 9.

FIG. 11 is an explanatory diagram illustrating an example of a signal waveform of each of signals to be transmitted on a clock lane and a data lane in a communication system according to a first modification example of the second embodiment.

FIG. 12 is an explanatory diagram illustrating an example of a signal waveform of each of signals to be transmitted on a clock lane and a data lane in a communication system according to a second modification example of the second embodiment.

FIG. 13 is an explanatory diagram illustrating an example of a signal waveform of each of signals to be transmitted on a clock lane and a data lane in a communication system according to a third modification example of the second embodiment.

FIG. 14 is an explanatory diagram illustrating an example of a signal waveform of each of signals to be transmitted on a clock lane and a data lane in a communication system according to a fourth modification example of the second embodiment.

FIG. 15 is an explanatory diagram illustrating an example of a signal waveform of each of signals to be transmitted on a clock lane and a data lane in a communication system according to a fifth modification example of the second embodiment.

FIG. 16 is a block diagram illustrating an overview of a communication system according to a third embodiment.

FIG. 17 is a block diagram illustrating a specific application example of the communication system illustrated in FIG. 16.

FIG. 18 is a flowchart illustrating an example of a data transmission process in the application example illustrated in FIG. 17.

FIG. 19 is a block diagram illustrating an overview of a communication system according to a fourth embodiment.

FIG. 20 is an explanatory diagram illustrating a first example of a signal waveform of each of signals to be transmitted on a clock lane and a data lane in the communication system according to the fourth embodiment.

FIG. 21 is an explanatory diagram illustrating a second example of a signal waveform of each of the signals to be transmitted on the clock lane and the data lane in the communication system according to the fourth embodiment.

FIG. 22 is a perspective view of an example of an external appearance configuration of a smartphone to which the communication system according to any of the embodiments is applicable.

FIG. 23 is a block diagram illustrating a configuration example of an application processor to which the communication system according to any of the embodiments is applicable.

FIG. 24 is a block diagram illustrating a configuration example of an image sensor to which the communication system according to any of the embodiments is applicable.

FIG. 25 is an explanatory diagram illustrating a mounting example of an on-vehicle camera to which the communication system according to any of the embodiments is applicable.

FIG. 26 is a block diagram illustrating a configuration example in which the communication system according to each of the embodiments is applicable to the on-vehicle camera.

MODES FOR CARRYING OUT THE INVENTION

Hereinafter, embodiments of the disclosure are described in detail with reference to the drawings. It is to be noted that description is given in the following order.

0. Communication System Using LP Signal and HS Differential Signal (Comparative Example) (FIGS. 1 to 4)
1. First Embodiment (First Example of Communication System Using Only HS Differential Signal) (FIGS. 5 to 7)
2. Second Embodiment (Second Example of Communication System Using Only HS Differential Signal)
    2.1 Configuration and Operation (FIGS. 9 to 10)
    2.2 Modification Examples (FIGS. 11 to 15)
3. Third Embodiment (Communication System Allowing For Switchover Between Two Communication Modes) (FIGS. 16 to 18)
4. Fourth Embodiment (Communication System Omitting Termination Control) (FIGS. 19 to 21)
5. Application Examples
    5.1 First Application Example (FIGS. 22 to 24)
    5.2 Second Application Example (FIGS. 25 and 26)
6. Other Embodiments

[0. Communication System Using LP Signal and HS Differential Signal]

Prior to description of a communication system according to embodiments, an overview of a communication system using an LP signal and an HS differential signal is first described as a comparative example.

FIG. 1 illustrates an overview of a communication system corresponding to a communication interface in accordance with, for example, the C-PHY standard or the D-PHY standard. The communication system illustrated in FIG. 1 includes a transmitter TX and a receiver RX. Further, the communication system includes a clock lane CL that allows a clock signal to be transmitted thereon and a data lane DL that allows a data signal such as an image signal to be transmitted thereon, for example, across the transmitter TX and the receiver RX. It is to be noted that FIG. 1 illustrates an example of the data lane DL having four data lanes DL1, DL2, DL3, and DL4; however, the number of the data lanes DL is not limited thereto, and, for example, only the single data lane DL1 may be also acceptable.

The transmitter TX includes a transmission digital circuit TX-DIGITAL and a transmission analog circuit TX-ANALOG For example, a 16-bit or 8-bit parallel signal is transmitted between the transmission digital circuit TX-DIGITAL and the transmission analog circuit TX-ANALOG The receiver RX includes a reception digital circuit RX-DIGITAL and a reception analog circuit RX-ANALOG. On each of the data lanes DL1, DL2, DL3, and DL4, for example, a 16-bit or 8-bit parallel signal is transmitted between the reception analog circuit RX-ANALOG and the reception digital circuit RX-DIGITAL. On the clock lane CL, for example, a 2-bit serial signal is transmitted between the reception analog circuit RX-ANALOG and the reception digital circuit RX-DIGITAL.

On the clock lane CL, coupling is made between the transmission analog circuit TX-ANALOG and the reception analog circuit RX-ANALOG through a clock signal line 30 that allows a differential clock signal to be transmitted therethrough. On the data lanes DL1, DL2, DL3, and DL4, coupling is made between the transmission analog circuit TX-ANALOG and the reception analog circuit RX-ANALOG through data signal lines 31, 32, 33, and 34, respectively, that allow differential data signals to be transmitted therethrough. Each of the clock signal line 30 and the data signal lines 31, 32, 33, and 34 has a pair of a positive signal line Dp and a negative signal line Dn through which differential signals are transmitted. For example, a 2-bit serial signal is transmitted through each of the clock signal line 30 and the data signal lines 31, 32, 33, and 34.

FIG. 2 illustrates a configuration example of a communication system according to a comparative example that achieves the communication system illustrated in FIG. 1. It is to be noted that FIG. 2 illustrates only the single data lane DL1 as the data lane DL in FIG. 1; however, the other data lanes DL2, DL3, and DL4 may have a substantially similar configuration.

The communication system according to the comparative example includes a transmitter 101 corresponding to the transmitter TX in FIG. 1, and a receiver 102 corresponding to the receiver RX in FIG. 1.

On the clock lane CL, the transmitter 101 includes a CL-HS circuit 111 that processes the HS differential signal, and a CL-LP circuit 112 that processes the LP signal. On the data lane DL1, the transmitter 101 includes a DL-HS circuit 113 that processes the HS differential signal, and a DL-LP circuit 114 that processes the LP signal.

On the clock lane CL, the receiver 102 includes a CL-HS circuit 121 that processes the HS differential signal, and a CL-LP circuit 122 that processes the LP signal. On the data lane DL1, the receiver 102 includes a DL-HS circuit 123 that processes the HS differential signal, and a DL-LP circuit 124 that processes the LP signal.

FIG. 3 illustrates a specific circuit configuration example of the communication system according to the comparative example illustrated in FIG. 2. Further, FIG. 4 illustrates an example of a signal waveform of each of signals to be transmitted on the clock lane CL and the data lane DL1 in the communication system according to the comparative example illustrated in FIG. 2.

As illustrated in FIG. 4, in the communication system according to the comparative example, on the clock lane CL, a status of a signal to be outputted onto the clock signal line 30 from the transmitter 101 has an HPS (High-Speed State) period in which the signal is put in a state of being transmitted in the form of the HS differential signal, and an LPS (Low-Power State) period in which the signal is put in a state of being transmitted in the form of the LP signal. A substantial clock signal is outputted in the form of the HS differential signal in the HPS period.

In a similar manner, on the data lane DL1, a status of a signal to be outputted onto the data signal line 31 from the transmitter 101 has the HPS period in which the signal is put in a state of being transmitted in the form of the HS differential signal, and the LPS period in which the signal is put in a state of being transmitted in the form of the LP signal. A substantial data signal is outputted in the form of the HS differential signal in the HPS period. It is to ne noted that a portion of the substantial data signal is denoted as HST in FIG. 4. Further, the HPS period includes a TRIAL period $T_{HS\text{-}TRIAL}$, a SYNC (synchronization) period $T_{HS\text{-}SYNC}$, and other periods. A blanking period that does not include a portion of the substantial data signal is included in the LPS period. The substantial data signal is outputted in a byte unit.

As illustrated in FIG. 3, the communication system includes a crystal oscillator (XTAL) 82 and a PLL circuit 81 that supply the clock signal to each of circuit sections inside the transmitter 101, and a crystal oscillator (XTAL) 83 that supplies the clock signal to each of circuit sections inside the receiver 102.

The CL-HS circuit 111 includes an HS state machine (HS FSM) 51, a selector 52, a parallel/serial (PS) conversion circuit 53, a clock divider (DIV) 54, and an HS driver (HS DRV) 55. The selector 52 selectively outputs a Toggle signal, a signal with a value of 0 (ALL0), and a signal with a value of 1 (ALL1). The Toggle signal is, for example, an 8-bit clock signal (1010_1010).

The CL-LP circuit 112 includes an LP state machine (LP FSM) 41, an LP encoder (LP ENC) 42, and an LP driver (LP DRV) 43. A clock lane control signal is inputted to the LP state machine 41.

The DL-HS circuit 113 includes an HS state machine (HS FSM) 71, a selector 72, a parallel/serial (PS) conversion circuit 73, and an HS driver (HS DRV) 74. A data transmission ready signal TxReadyHS is outputted from the HS state machine 71. The selector 72 selectively outputs a transmission data TxDataHS, a synchronization code signal SYNC, the signal with a value of 0 (ALL0), and the signal with a value of 1 (ALL1).

The DL-LP circuit 114 includes an LP state machine (LP FSM) 61, an LP encoder (LP ENC) 62, and an LP driver (LP DRV) 63. A data transmission request signal TxRequestHS is inputted to the LP state machine 61.

It is to be noted that, in the transmitter 101, the LP driver 43, the HS driver 55, the LP driver 63, and the HS driver 74 correspond to the transmission analog circuit TX-ANALOG in FIG. 1.

The CL-HS circuit 121 includes a termination circuit (TERM) 56 that serves as a clock signal termination circuit, an HS receiver (HS RCV) 57, and a clock divider (DIV) 58. The termination circuit 56 has a termination resistor.

The CL-LP circuit 122 includes an LP receiver (LP RCV) 44, an LP decoder (LP DEC) 45, and an LP state machine (LP FSM) 46. The LP state machine 46 outputs a status signal of the clock lane CL.

The DL-HS circuit 123 includes a termination circuit (TERM) 75 that serves as a data signal termination circuit, an HS receiver (HS RCV) 76, a clock divider (DIV) 77, and a word alignment correction circuit (ALN) 78. The termination circuit 75 has a termination resistor. The word alignment correction circuit (ALN) 78 outputs a reception synchronization signal RxSyncHS, a reception valid signal RxValidHS, and reception data RxDataHS.

The DL-LP circuit 124 includes an LP receiver (LP RCV) 64, an LP decoder (LP DEC) 65, and an LP state machine (LP FSM) 66. The LP state machine 66 outputs a reception active signal RxActiveHS.

It is to be noted that, in the receiver 102, primarily the LP receiver 44, the termination circuit 56, the HS receiver 57, the LP receiver 64, the termination circuit 75, and the HS receiver 76 correspond to the reception analog circuit RX-ANALOG in FIG. 1.

[1. First Embodiment]

Next, description is provided on a first embodiment of the disclosure. Hereinafter, description of configurations and workings substantially similar to those in the foregoing comparative example is omitted as appropriate.

FIG. 5 illustrates an overview of a communication system according to the first embodiment of the disclosure that achieves the communication system illustrated in FIG. 1. FIG. 6 illustrates a specific circuit configuration example of the communication system illustrated in FIG. 5. Further, FIG. 7 illustrates an example of a signal waveform of each of signals to be transmitted on the clock lane CL and the data lane DL1 in the communication system illustrated in FIG. 5. It is to be noted that FIGS. 5 to 7 illustrate only the single data lane DL1 as the data lane DN in FIG. 1; however, the other data lanes DL2, DL3, and DL4 may have a substantially similar configuration.

The communication system according to the present embodiment includes a transmitter 1 (a transmission device) corresponding to the transmitter TX in FIG. 1, and a receiver 2 (a reception device) corresponding to the receiver RX in FIG. 1.

As illustrated in FIG. 7, in the communication system according to the present embodiment, on the clock lane CL, all signals to be outputted onto the clock signal line 30 from the transmitter 1 including a blanking period are only the HS differential signals. As described later, on the clock lane CL, in the blanking period, a differential blanking signal with a predetermined first signal value (for example, HS-0), and a differential signal with a predetermined second signal value (for example, HS-1) that is different from the predetermined first signal value are outputted as a predetermined blanking signal from the transmitter 1 onto the clock signal line 30.

It is to be noted that HS-0 indicates a differential signal with a value of 0 (differential 0 (Differential-0)), and HS-1 indicates a differential signal with a value of 1 (differential 1 (Differential-1)). More specifically, as represented in FIG. 8, the HS-0 signal refers to a differential signal in which a voltage level of the positive signal line Dp in a transmission line of the differential signal becomes Low, and a voltage level of the negative signal line Dn becomes High. Further, the HS-1 signal refers to a differential signal in which a voltage level of the positive signal line Dp in the transmission line of the differential signal becomes High, and a voltage level of the negative signal line Dn becomes Low.

Similarly, on the data lane DL1, all signals to be outputted onto the data signal line 31 from the transmitter 1 including the blanking period are only the HS differential signals.

It is to be noted that, in FIG. 7, a substantial data signal portion is denoted as HST. Periods before and after the period of a substantial data signal may include the SYNC (synchronization) period $T_{HS\text{-}SYNC}$ and the TRIAL period $T_{HS\text{-}TRIAL}$. On the data lane DL1, in the blanking period, any differential signal (for example, HS-0 or HS-1) may be outputted over the whole blanking period as a predetermined blanking signal from the transmitter 1 onto the data signal line 31.

As illustrated in FIG. 6, the communication system according to the present embodiment includes the crystal oscillator (XTAL) 82 and the PLL circuit 81 that supply the clock signal to each of circuit sections inside the transmitter 1, and the crystal oscillator (XTAL) 83 and a PLL circuit 84 that supply the clock signal to each of circuit sections inside the receiver 2.

On the clock lane CL, the transmitter 1 includes a CL-HS circuit 11 that processes the HS differential signal. On the data lane DL1, the transmitter 1 includes a DL-HS circuit 13 that processes the HS differential signal.

The CL-HS circuit 11 may be also a differential clock signal transmitting circuit that outputs the HS differential signal including the differential clock signal onto the clock signal line 30. The DL-HS circuit 13 may be also a differential data signal transmitting circuit that outputs the differential data signal onto the data signal line 31.

The transmitter 1 in the present embodiment may not include circuits corresponding to the CL-LP circuit 112 and the DL-LP circuit 114 that process the LP signal in the above-described comparative example.

The CL-HS circuit 11 may include a circuit that is substantially similar to the CL-HS circuit 111 in FIG. 3, as illustrated in FIG. 6. In other words, the CL-HS circuit 11 may include the HS state machine (HS FSM) 51, the selector 52, the parallel/serial (PS) conversion circuit 53, the clock divider (DIV) 54, and the HS driver (HS DRV) 55. The selector 52 selectively outputs a Toggle signal, the signal with a value of 0 (ALL0) equivalent to the predetermined first signal value (HS-0), and the signal with a value of 1 (ALL1) equivalent to the predetermined second signal value (HS-1). The Toggle signal is, for example, an 8-bit clock signal (1010_1010). In the present embodiment, the clock lane control signal and the data transmission request signal TxRequestHS are inputted to the HS state machine 51.

The DL-HS circuit 13 may include a circuit that is substantially similar to the DL-HS circuit 113 in FIG. 3, as illustrated in FIG. 6. In other words, the DL-HS circuit 13 may include the HS state machine (HS FSM) 71, the selector 72, the parallel/serial (PS) conversion circuit 73, and the HS driver (HS DRV) 74. The data transmission ready signal TxReadyHS is outputted from the HS state machine 71. The selector 72 selectively outputs the transmission data TxDataHS, a synchronization code signal SYNC, the signal with a value of 0 (ALL0) equivalent to the predetermined first signal value (HS-0), and the signal with a value of 1 (ALL1) equivalent to the predetermined second signal value (HS-1).

The transmitter 1 includes a blanking controller 20. The blanking controller 20 may include the HS state machine 51 and the HS state machine 71, as illustrated in FIG. 6.

The blanking controller 20 controls the DL-HS circuit 13 so as to output a predetermined data blanking signal, in place of the data signal, from the DL-HS circuit 13 to the data signal line 31 in synchronization with a starting time of the blanking period of the data signal. Further, the blanking controller 20 controls the CL-HS circuit 11 so as to output a differential blanking signal in which the predetermined first signal value (for example, HS-0) continues throughout a predetermined period or longer, in place of the clock signal, from the CL-HS circuit 11 to the clock signal line 30 in synchronization with the starting time of the blanking period of the data signal. Here, the predetermined period refers to a period that is longer than a clock cycle of the clock signal. The differential blanking signal is a signal in which the predetermined first signal value continues throughout a period longer than the clock cycle of the clock signal, which makes it possible to detect a signal variation in a clock state discrimination circuit 59 in the receiver 2 to be described later, thereby detecting starting of the blanking period.

Further, the blanking controller 20 controls the CL-HS circuit 11 so as to output a predetermined differential signal different from the differential blanking signal, in place of the differential blanking signal, from the CL-HS circuit 11 to the clock signal line 30 in synchronization with an ending time of the blanking period of the data signal. Specifically, the blanking controller 20 controls the CL-HS circuit 11 so as to output, as the predetermined differential signal, a differential signal in which the predetermined second signal value (for example, HS-1) different from the predetermined first signal value continues throughout the predetermined period or longer. It is to be noted that the predetermined first signal value in the above description may be HS-1, and the predetermined second signal values may be HS-0. The predetermined differential signal is a differential signal in which the predetermined second signal value different from the predetermined first signal value continues throughout the predetermined period or longer, which makes it possible to detect a signal variation in the clock state discrimination circuit 59 in the receiver 2 to be described later, thereby detecting ending of the blanking period and starting of transfer of the data signal.

On the clock lane CL, the receiver 2 includes a CL-HS circuit 21 that processes the HS differential signal. On the data lane DL1, the receiver 2 includes a DL-HS circuit 23 that processes the HS differential signal.

The DL-HS circuit 23 may be also a differential data signal receiving circuit that receives the differential signal through the data signal line 31. The CL-HS circuit 21 may be also a differential clock signal receiving circuit that receives the differential clock signal and the differential blanking signal that is outputted from the above-described CL-HS circuit 11 through the clock signal line 30.

The receiver 2 in the present embodiment may not include circuits corresponding to the CL-LP circuit 122 and the DL-LP circuit 124 that process the LP signal in the above-described comparative example.

The DL-HS circuit 23 may include a circuit that is substantially similar to the DL-HS circuit 123 in FIG. 3, as illustrated in FIG. 6. In other words, the DL-HS circuit 23 may include the termination circuit (TERM) 75 that serves as a data signal termination circuit coupled to the data signal line 31, the HS receiver (HS RCV) 76, the clock divider (DIV) 77, and the word alignment correction circuit (ALN) 78. The termination circuit 75 has a termination resistor. The word alignment correction circuit (ALN) 78 outputs the reception synchronization signal RxSyncHS, the reception valid signal RxValidHS, and the reception data RxDataHS.

The CL-HS circuit 21 may include a circuit that is substantially similar to the CL-HS circuit 121 in FIG. 3, as illustrated in FIG. 6. In other words, the CL-HS circuit 21 may include the termination circuit (TERM) 56 that serves as a clock signal termination circuit coupled to the clock signal line 30, the HS receiver (HS RCV) 57, and the clock divider (DIV) 58. The termination circuit 56 has a termination resistor.

The CL-HS circuit 21 further includes the clock (CL) state discrimination circuit 59. The clock state discrimination circuit 59 receives the clock signal incoming from the CL-HS circuit 11 of the transmitter 1 through the HS receiver 57, the differential blanking signal (for example, HS-0) with the predetermined first signal value (for example, HS-0), and the differential signal with the predetermined second signal value (for example, HS-1).

The clock state discrimination circuit 59 has a function as a termination control circuit, and controls a data signal termination circuit (the termination circuit 75) and a clock signal termination circuit (the termination circuit 56) to turn off respective termination resistors on the basis of the differential blanking signal. Further, the clock state discrimination circuit 59 controls the termination circuit 75 and the termination circuit 56 to turn on the respective termination resistors on the basis of the differential signal with the predetermined second signal value (for example, HS-1) that is outputted in synchronization with the ending time of the blanking period of the data signal.

It is to be noted that, in association with on/off switching of the termination resistors, a signal voltage amplitude varies in the blanking period on each of the clock lane CL and the data lane DL1, as illustrated in FIG. 7. Further, turning off the termination control in the blanking period makes it possible to reduce values of currents flowing through the clock signal line 30 and the data signal line 31.

Further, the clock state discrimination circuit 59 has a function of outputting the reception active signal RxActiveHS and performing word alignment control for the word alignment correction circuit 78. The clock state discrimination circuit 59 properly detects ending of the blanking period and starting of transfer of the data signal, which makes it possible to detect the synchronization code signal SYNC, and to perform the word alignment control with use of the word alignment correction circuit 78.

[Effects]

As described above, according to the present embodiment, the differential blanking signal in which the predetermined first signal value continues throughout the predetermined period or longer is outputted, in place of the clock signal, onto the clock signal line 30 in synchronization with the starting time of the blanking period of the data signal, which makes it possible to reduce power consumption for data transmission.

In addition, the differential clock signal, and the differential blanking signal in which the predetermined first signal value continues throughout the predetermined period or longer and that is outputted in synchronization with the starting time of the blanking period of the data signal are received through the clock signal line 30, which makes it possible to reduce power consumption for data transmission.

Further, according to the present embodiment, it is possible to transfer the data signal with use of the HS differential signal to a LP signal portion (the blanking period) as well that is not used effectively in the communication system according to the above-described comparative example. This makes it possible to lower a transfer rate of the data signal with use of the HS differential signal, thereby achieving low power consumption as a whole. In addition, according to the present embodiment, the necessity of a circuit for processing the LP signal is eliminated, which makes it possible to reduce a circuit size, in comparison with the communication system according to the above-described comparative example.

It is to be noted that the effects described herein are merely exemplified and non-limiting, and effects achieved by the technology may be effects other than those described herein. The same is true for effects of the following other embodiments.

[2. Second Embodiment]

Next, description is provided on a second embodiment of the disclosure. Hereinafter, description of configurations and workings substantially similar to those in the foregoing comparative example and the above-described first embodiment is omitted as appropriate.

FIG. 9 illustrates a specific circuit configuration example of the communication system according to the present embodiment. Further, FIG. 10 illustrates an example of a signal waveform of each of signals to be transmitted on the clock lane CL and the data lane DL1 in the communication system according to the present embodiment. It is to be noted that FIGS. 9 and 10 illustrate only the single data lane DL1 as the data lane DN in FIG. 1; however, the other data lanes DL2, DL3, and DL4 may have a substantially similar configuration. It is to be noted that a block configuration representing an overview of the communication system according to the present embodiment may be substantially similar to the block configuration in FIG. 5.

In the present embodiment as well, as with the above-described first embodiment, the blanking controller 20 controls the CL-HS circuit 11 so as to output a predetermined differential signal different from the differential blanking signal, in place of the differential blanking signal, from the CL-HS circuit 11 to the clock signal line 30 in synchronization with the ending time of the blanking period of the data signal. In the above-described first embodiment, the blanking controller 20 controls the CL-HS circuit 11 so as to output, as the predetermined differential signal, a differential signal in which the predetermined second signal value (for example, HS-1) continues throughout the predetermined period or longer. In contrast, in the present embodiment, the blanking controller 20 controls the CL-HS circuit 11 so as to output the clock signal as the predetermined differential signal throughout the predetermined period or longer. The predetermined differential signal is the clock signal that is outputted throughout the predetermined period or longer, which makes it possible to detect a signal variation in the clock state discrimination circuit 59 in the receiver 2, thereby detecting ending of the blanking period and starting of transfer of the data signal.

In the present embodiment, on the clock lane CL, in the blanking period, the differential blanking signal with the predetermined first signal value (for example, HS-0 or HS-1), and the clock signal are outputted from the transmitter 1 to the clock signal line 30, as illustrated in FIG. 7.

As compared with a circuit configuration in FIG. 6, a signal to be inputted to the clock state discrimination circuit 59 in the CL-HS circuit 21 of a receiver 2A is different in a circuit in FIG. 9. In other words, in the receiver 2 in the circuit configuration illustrated in FIG. 6, a signal from the HS receiver 57 is directly inputted to the clock state discrimination circuit 59. In contrast, in the receiver 2A in the circuit configuration illustrated in FIG. 9, the signal from the HS receiver 57 is not directly inputted to the clock state discrimination circuit 59, but a signal divided by the clock divider 58 is inputted to the clock state discrimination circuit 59. In such a manner, the starting time and the ending time of the blanking period are detected.

Other configurations and operation may be substantially similar to those of the communication system according to the above-described first embodiment.

[2.2 Modification Examples]

Next, description is provided on first to fifth modification examples of the communication system according to the second embodiment.

Each of FIGS. 11 to 15 illustrates an example of a signal waveform of each of signals to be transmitted on the clock lane CL and the data lane DL1 in the communication system according to each of the first to fifth modification examples. It is to be noted that FIGS. 11 to 15 illustrate only the single data lane DL1 as the data lane DN in FIG. 1; however, the other data lanes DL2, DL3, and DL4 may have a substantially similar configuration. Further, a block configuration representing an overview of the communication system according to the present embodiment may be substantially similar to the block configuration in FIG. 5.

(First Modification Example)

In the first modification example illustrated in FIG. 11, a signal to be outputted from the transmitter 1 to the data lane DL1 in the blanking period is different from that in an example illustrated in FIG. 10. On the data lane DL1, in the blanking period, a differential signal having an inverted value of the last value of the substantial data signal to be transmitted in the HST period is first outputted as a predetermined data blanking signal from the DL-HS circuit 13 of the transmitter 1. Thereafter, a differential signal with a differential of 0 (HS-0) is outputted from the DL-HS circuit 13.

The blanking controller 20 controls the DL-HS circuit 13 so as to output a differential signal having an inverted value of the last value of the data signal from the DL-HS circuit 13 to the data signal line 31 in synchronization with the starting time of the blanking period. Further, the blanking controller 20 controls the DL-HS circuit 13 so as to output a differential signal of HS-0, in place of the differential signal having an inverted value of the last value of the data signal, from the DL-HS circuit 13 to the data signal line 31 in synchronization with the ending time of the blanking period. It is to be noted that, as with the example in FIG. 10, the clock signal is outputted from the CL-HS circuit 11 of the transmitter 1 to the clock signal line 30 throughout the predetermined period or longer in synchronization with the ending time of the blanking period. Starting times of output of the differential signal of HS-0 and the clock signal that are outputted in the blanking period may be different from each other.

According to the first modification example, by outputting the differential signal of HS-0 in the last period of the blanking period on the data lane DL1, a signal value in the last period of the blanking period and a signal value at the beginning of the subsequent SYNC (synchronization) period $T_{HS\text{-}SYNC}$ are made to be identical to each other, which makes it possible to facilitate synchronization processing on the reception side. Further, a signal in the TRIAL period $T_{HS\text{-}TRIAL}$ on the data lane DL1 is typically a differential signal having an inverted value of the last value of the data signal. Therefore, according to the first modification example, it is possible to match a signal value at the beginning of the blanking period to the signal in the TRIAL period $T_{HS\text{-}TRIAL}$.

The signal waveform in the present modification example may be substantially similar to the signal waveform in FIG. 10, with exceptions described above.

(Second Modification Example)

In the second modification example illustrated in FIG. 12, a signal to be outputted from the CL-HS circuit 11 of the transmitter 1 to the clock signal line 30 is partly different from that in the first modification example illustrated in FIG. 11. On the clock lane CL, in the blanking period, as with the above-described first embodiment illustrated in FIG. 7, a differential signal with the predetermined first signal value (for example, HS-0 or HS-1) is first outputted from the CL-HS circuit 11 of the transmitter 1. Thereafter, as with the above-described first embodiment, a differential signal with the second signal value (for example, HS-1 or HS-0) different from the predetermined first signal value is outputted from the CL-HS circuit 11. Afterward, after passing of a time for turning on termination resistors, the clock signal is outputted from the CL-HS circuit 11. The second modification example is different from the above-described first modification example in that after the differential signal with the second signal value is outputted from the CL-HS circuit 11, the clock signal is next outputted after passing of the time for turning on the termination resistors. The blanking controller 20 controls the CL-HS circuit 11 so as to output the differential signal and the control signal from the CL-HS circuit 11 in a proper timing sequence.

According to the second modification example, as compared with the case where the termination resistors are turned on during an output period of the clock signal as in the first modification example, it is possible to reduce an influence of waveform disturbance that is caused by reflection of the clock signal in an off state of the termination resistors in the clock lane CL.

The present modification example may be substantially similar to the first modification example in FIG. 11, with exceptions described above.

(Third Modification Example)

In the third modification example illustrated in FIG. 13, a signal to be outputted from the transmitter 1 to the data lane DL1 in the blanking period is different from that in the second modification example illustrated in FIG. 12. In the third modification example, a differential signal of HS-0 is outputted as a predetermined data blanking signal from the DL-HS circuit 13 of the transmitter 1 throughout the whole blanking period. The blanking controller 20 controls the DL-HS circuit 13 so as to output the differential signal of HS-0 from the DL-HS circuit 13 in a proper timing sequence.

The present modification example may be substantially similar to the second modification example in FIG. 12, with exceptions described above.

(Fourth Modification Example)

In the fourth modification example illustrated in FIG. 14, a signal to be outputted from the transmitter 1 to the data lane DL1 in the blanking period is partly different from that in the first modification example illustrated in FIG. 11. In the fourth modification example, on the data lane DL1, in the blanking period, a differential signal of HS-1 is first outputted as a predetermined data blanking signal from the DL-HS circuit 13 of the transmitter 1. Thereafter, a differential signal of HS-0 is outputted from the DL-HS circuit 13. The blanking controller 20 controls the DL-HS circuit 13 so as to output the differential signal of HS-1 and the differential signal of HS-0 from the DL-HS circuit 13 in a proper timing sequence.

The present modification example may be substantially similar to the first modification example in FIG. 11, with exceptions described above.

(Fifth Modification Example)

In the fifth modification example illustrated in FIG. 15, a signal to be outputted from the transmitter 1 to the data lane DL1 in the blanking period is partly different from that in the second modification example illustrated in FIG. 12. In the fifth modification example, on the data lane DL1, in the blanking period, a differential signal of HS-1 is first outputted as a predetermined data blanking signal from the DL-HS circuit 13 of the transmitter 1. Thereafter, a differential signal of HS-0 is outputted from the DL-HS circuit 13. The blanking controller 20 controls the DL-HS circuit 13 so as to output the differential signal of HS-1 and the differential signal of HS-0 from the DL-HS circuit 13 in a proper timing sequence.

The present modification example may be substantially similar to the second modification example in FIG. 12, with exceptions described above.

[3. Third Embodiment]

Next, description is provided on a third embodiment of the disclosure. Hereinafter, description of configurations and workings substantially similar to those in the foregoing comparative example, the above-described first embodiment, and the above-described second embodiment is omitted as appropriate.

FIG. 16 illustrates an overview of a communication system according to the third embodiment of the disclosure. The communication system according to the present embodiment includes a transmitter 1B (a transmission device) corresponding to the transmitter TX in FIG. 1, and a receiver 2B (a reception device) corresponding to the receiver RX in FIG. 1.

In the communication systems according to the above-described first and second embodiments, all signals to be transmitted on each of the clock lane CL and the data lane DL1 including the blanking period are only the HS differential signals. In contrast, the communication system according to the present embodiment includes a switching circuit that enables communication using the LP signal as well, allowing for switchover between a mode of performing communication using only the HS differential signal without using the LP signal and a mode of performing communication using both the LP signal and the HS differential signal.

In the communication system according to the present embodiment, the transmitter 1B includes the blanking controller 20 that achieves a function that is substantially similar to the function of each of the communication systems according to the above-described first and second embodiments.

Moreover, on the clock lane CL, the transmitter 1B further includes the CL-HS circuit 11 that processes the HS differential signal, a CL-LP circuit 12 that processes the LP signal, a changeover switch 15, and a selector 17.

The CL-LP circuit 12 may be a first single-end signal transmitting circuit that outputs a first single-end signal as the LP signal. The CL-LP circuit 12 may have a function that is substantially similar to the function of the CL-LP circuit 112 in FIG. 2. The changeover switch 15 may be a first transmission switching circuit that switches signal output paths so as to allow a signal to be outputted from one of the CL-HS circuit 11 and the CL-LP circuit 12 to the clock signal line 30. The selector 17 is a circuit that allows a control signal from the blanking controller 20 to be inputted to the CL-HS circuit 11 in the mode of performing communication using only the HS differential signal without using the LP signal and allows the control signal from the blanking controller 20 not to bet inputted to the CL-HS circuit 11 in the mode of performing communication using both the LP signal and the HS differential signal.

On the data lane DL1, the transmitter 1B further includes the DL-HS circuit 13 that processes the HS differential signal, a DL-LP circuit 14 that processes the LP signal, a changeover switch 16, and a selector 18.

The DL-LP circuit 14 may be a second single-end signal transmitting circuit that outputs a second single-end signal as the LP signal. The DL-LP circuit 14 may have a function that is substantially similar to the function of the DL-LP circuit 114 in FIG. 2. The changeover switch 16 may be a second transmission switching circuit that switches signal output paths so as to allow a signal to be outputted from one of the DL-HS circuit 13 and the DL-LP circuit 14 to the data signal line 31. The selector 18 is a circuit that allows a control signal from the blanking controller 20 to be inputted to the DL-HS circuit 13 in the mode of performing communication using only the HS differential signal without using the LP signal and allows the control signal from the blanking controller 20 not to be inputted to the DL-HS circuit 13 in the mode of performing communication using both the LP signal and the HS differential signal.

On the clock lane CL, the receiver 2B includes the CL-HS circuit 21 that processes the HS differential signal, a CL-LP circuit 22 that processes the LP signal, a selector 25, a selector 27, and a selector 28. The CL-LP circuit 22 may be a first single-end signal receiving circuit that receives a first single-end signal as the LP signal through the clock signal line 30. The CL-LP circuit 22 may have a function that is substantially similar to the function of the CL-LP circuit 122 in FIG. 2.

The selector 25 may be a first reception switching circuit that switches whether or not to receive the first single-end signal as the LP signal. The selector 25 is a circuit that allows a signal received through the clock signal line 30 not to be inputted to the CL-LP circuit 22 in the mode of performing communication using only the HS differential signal without using the LP signal and allows the signal received through the clock signal line 30 to be inputted to the CL-LP circuit 22 in the mode of performing communication using both the LP signal and the HS differential signal. The selector 27 is a circuit that allows a termination control signal from the CL-HS circuit 21 to be inputted to the DL-HS circuit 23 in the mode of performing communication using only the HS differential signal without using the LP signal and allows the termination control signal from the CL-HS circuit 21 not to be inputted to the DL-HS circuit 23 in the mode of performing communication using both the LP signal and the HS differential signal. The selector 28 is a circuit that allows a word alignment control signal from the CL-HS circuit 21 to be inputted to the DL-HS circuit 23 in the mode of performing communication using only the HS differential signal without using the LP signal and allows the word alignment control signal from the CL-HS circuit 21 not to be inputted to the DL-HS circuit 23 in the mode of performing communication using both the LP signal and the HS differential signal.

On the data lane DL1, the receiver 2B further includes the DL-HS circuit 23 that processes the HS differential signal, a DL-LP circuit 24 that processes the LP signal, and a selector 26. The DL-LP circuit 24 may be a second single-end signal receiving circuit that receives a second single-end signal as the LP signal through the data signal line 31.

The selector 26 may be a second reception switching circuit that switches whether or not to receive the second single-end signal as the LP signal. The selector 26 is a circuit that allows a signal received through the data signal line 31 not to be inputted to the DL-LP circuit 24 in the mode of performing communication using only the HS differential signal without using the LP signal and allows the signal received through the data signal line 31 to be inputted to the DL-LP circuit 24 in the mode of performing communication using both the LP signal and the HS differential signal.

FIG. 17 illustrates a specific application example of the communication system according to the present embodiment.

For example, the communication system according to the present embodiment is applicable to data transmission from an image sensor IS to an application processor AP, as illustrated in FIG. 17. The transmitter 1B is provided inside the image sensor IS. The receiver 2B is provided inside the application processor AP. Coupling is made between the image sensor IS and the application processor AP through the clock signal line 30 and the data signal line 31. Signal transmission through the clock signal line 30 and the data signal line 31 is carried out in one direction.

Moreover, coupling is made between the image sensor IS and the application processor AP through a bidirectional control bus 35. As the control bus 35, it is possible to use an I$^2$C (Inter-Integrated Circuit) interface and an I$^3$C interface as an extended version of the I$^2$C interface.

FIG. 18 illustrates an example of a data transmission process in an apparatus incorporating the image sensor IS and the application processor AP that are illustrated in FIG. 17.

When the apparatus incorporating the image sensor IS and the application processor AP is powered on (step S101), the application processor AP reads register settings of the image sensor IS using the control bus 35 (step S102). In such a manner, the application processor AP determines whether or not the image sensor IS is compatible with communication without using the LP signal (step S103). In other words, the application processor AP determines whether the image sensor IS is compatible with either the mode of performing communication using only the HS differential signal without using the LP signal or the mode of performing communication using both the LP signal and the HS differential signal.

In a case where the application processor AP determines that the image sensor IS is compatible with the communication without using the LP signal (step S103: Y), the application processor AP sends setting of enabling the communication without using the LP signal to the image sensor IS using the control bus 35 (step S104). Next, the application processor AP outputs a signal indicating start of transmission to the image sensor IS using the control bus 35 (step S105). In a case where the application processor AP determines that the image sensor IS is not compatible with the communication without using the LP signal (step S103: N), the application processor AP considers that the image sensor IS is compatible with the mode of performing communication using both the LP signal and the HS differential signal, and outputs a signal indicating start of transmission to the image sensor IS using the control bus 35 (step S105). Next, the image sensor IS starts transmission of the data signal upon reception of the signal indicating start of transmission (step S106).

[4. Fourth Embodiment]

Next, description is provided on a fourth embodiment of the disclosure. Hereinafter, description of configurations and workings substantially similar to those in the foregoing comparative example and the above-described first to third embodiments is omitted as appropriate.

FIG. 19 illustrates an overview of a communication system according to the fourth embodiment of the disclosure. FIG. 20 illustrates a first example of a signal waveform of each of signals to be transmitted on the clock lane CL and the data lane DL1 in the communication system according to the present embodiment. FIG. 21 illustrates a second example of a signal waveform of each of signals to be transmitted on the clock lane CL and the data lane DL1 in the communication system according to the present embodiment. It is to be noted that FIGS. 19 to 21 illustrate only the single data lane DL1 as the data lane DN in FIG. 1; however, the other data lanes DL2, DL3, and DL4 may have a substantially similar configuration.

The communication system according to the present embodiment is different in a portion of termination control from a configuration of the communication system as illustrated in FIG. 5. In the above-described first to third embodiments, on/off control of the termination resistors is carried out in the blanking period. In contrast, the on/off control of the termination resistors is omitted in the present embodiment.

The first example in FIG. 20 illustrates an example of a case where the termination resistors on the clock lane CL and the data line DL are always put in an on state. In the case of the first example in FIG. 20, termination resistors that are on/off switchable may be provided and may be always put in the on state, or termination resistors that are fixed to the on state may be provided.

Further, the second example in FIG. 21 illustrates an example of a case where the termination resistors on the clock lane CL and the data line DL are always put in an off state. In the case of the second example in FIG. 21, the termination resistors themselves may be omitted, or the termination resistors that are on-off switchable may be provided and may be always put in the off state.

The first example in FIG. 20 and the second example in FIG. 21 are different from each other in signal voltage amplitude. In a case where the termination resistors are turned on, the signal amplitude becomes lower as compared with a case where the termination resistors are turned off. Therefore, the voltage amplitude in the first example in FIG. 20 is lower than the voltage amplitude in the second example in FIG. 21.

The signal waveform in the present embodiment may be substantially similar to the signal waveform in FIG. 11, with exceptions described above.

[5. Application Examples]

Next, description is provided on application examples of the communication system described in each of the above-described embodiments.

[5.1 First Application Example]

FIG. 22 illustrates an external view of a smartphone 300 (a multifunctional mobile phone) to which the communication system according to any of the above-described embodiments is applied. A variety of devices are built into the smartphone 300, and the communication system according to any of the above-described embodiments is applied to a communication system that exchanges data among these devices.

FIG. 23 illustrates a configuration example of an application processor 310 used in the smartphone 300. The application processor 310 includes a CPU (Central Processing Unit) 311, a memory controller 312, a power source controller 313, an external interface 314, a GPU (Graphics Processing Unit) 315, a media processor 316, a display controller 317, and an MIPI interface 318. In this example, the CPU 311, the memory controller 312, the power source controller 313, the external interface 314, the GPU 315, the media processor 316, and the display controller 317 are coupled to a system bus 319 to allow for data exchange among them through the system bus 319.

The CPU 311 processes various information to be handled in the smartphone 300 in accordance with programs. The memory controller 312 controls a memory 501 to be used by the CPU 311 for information processing operation. The power source controller 313 controls a power source of the smartphone 300.

The external interface 314 is an interface for communication with external devices, and is coupled to a wireless communication section 502 and an image sensor 410 in this example. The wireless communication section 502 performs wireless communication with mobile phone base stations, and includes, for example, a baseband section, an RF (Radio Frequency) front-end section, and any other section. The image sensor 410 acquires an image, and includes, for example, a CMOS sensor.

The GPU 315 carries out image processing operation. The media processor 316 processes information such as voice, characters, and graphics. The display controller 317 controls a display 504 through the MIPI interface 318.

The MIPI interface 318 transmits image signals to the display 504. As such image signals, it is possible to use, for example, signals of YUV format, RGB format, and other format. For example, the communication system according to any of the above-described embodiments is applicable to a communication system between the MIPI interface 318 and the display 504.

FIG. 24 illustrates a configuration example of the image sensor 410. The image sensor 410 includes a sensor section 411, an ISP (Image Signal Processor) 412, a JPEG (Joint Photographic Experts Group) encoder 413, a CPU 414, a RAM (Random Access Memory) 415, a ROM (Read Only Memory) 416, a power source controller 417, an I$^2$C (Inter-Integrated Circuit) interface 418, and an MIPI interface 419. In this example, each of these blocks is coupled to a system bus 420 to allow for data exchange among these blocks through the system bus 420.

The sensor section 411 acquires an image, and includes, for example, a CMOS sensor. The ISP 412 performs predetermined processing operation for the image acquired by the sensor section 411. The JPEG encoder 413 encodes the image processed by the ISP 412 to generate a JPEG-format image. The CPU 414 controls each block of the image sensor 410 in accordance with a program. The RAM 415 is a memory to be used by the CPU 414 for information processing operation. The ROM 416 stores programs to be executed in the CPU 414. The power source controller 417 controls a power source of the image sensor 410. The I²C interface 418 receives a control signal from the application processor 310. Further, although not illustrated, the image sensor 410 also receives a clock signal from the application processor 310 in addition to the control signal. Specifically, the image sensor 410 is configured to be operable on the basis of clock signals at various frequencies.

The MIPI interface 419 transmits image signals to the application processor 310. As such image signals, it is possible to use, for example, signals of the YUV format, the RGB format, and other format. For example, the communication system according to any of the above-described embodiments is applicable to a communication system between the MIPI interface 419 and the application processor 310.

[5.2 Second Application Example]

Each of FIGS. 25 and 26 illustrates a configuration example of an on-vehicle camera as an example of application to an imaging apparatus. FIG. 25 illustrates a mounting example of the on-vehicle camera, and FIG. 26 illustrates an internal configuration example of the on-vehicle camera.

For example, on-vehicle camera 401, 402, 403, and 404 are respectively mounted on the front (forward), left, right, and rear (backward) of a vehicle 301, as illustrated in FIG. 25. Each of the on-vehicle cameras 401 to 404 is coupled to an ECU 302 (Electrical Control Unit) through an in-vehicle network.

An image-capturing angle of the on-vehicle camera 401 mounted on the front of the vehicle 301 is, for example, in a range indicated with "a" in FIG. 25. The image-capturing angle of the on-vehicle camera 402 is, for example, in a range indicated with "b" in FIG. 25. The image-capturing angle of the on-vehicle camera 403 is, for example, in a range indicated with "c" in FIG. 25. The image-capturing angle of the on-vehicle camera 404 is, for example, in a range indicated with "d" in FIG. 25. Each of the on-vehicle cameras 401 to 404 outputs a captured image to the ECU 302. As a result, it is possible to capture an image of 360-degree view (omnidirectional view) including front, right and left, and rear sides of the vehicle 301 in the ECU 302.

For example, each of the on-vehicle cameras 401 to 404 includes an image sensor 431, a DSP (Digital Signal Processing) circuit 432, a selector 433, and a SerDes (SERializer/DESerializer) circuit 444, as illustrated in FIG. 26.

The DSP circuit 432 performs a variety of image signal processing operation for an imaging signal outputted from the image sensor 431. The SerDes circuit 444 performs serial/parallel conversion of a signal, and includes an on-vehicle interface chip such as FDP-Link III, for example.

The selector 433 selects whether to output the imaging signal outputted from the image sensor 431 through the DSP circuit 432, or not through the DSP circuit 432.

For example, the communication system according to any of the above-described embodiments is applicable to a coupling interface 441 between the image sensor 431 and the DSP circuit 432. Further, for example, the communication system according to any of the above-described embodiments is applicable to a coupling interface 442 between the image sensor 431 and the selector 433.

[6. Other Embodiments]

The technology achieved by the disclosure is not limited to that described in the above-described respective embodiments, and may be modified in a variety of ways.

For example, the technology may be configured as follows.

(1)

A transmission device including:
   a clock signal transmitting circuit that outputs a clock signal onto a clock signal line;
   a data signal transmitting circuit that outputs a data signal onto a data signal line; and
   a blanking controller that controls the clock signal transmitting circuit to output a predetermined blanking signal, in place of the clock signal, from the clock signal transmitting circuit to the clock signal line in synchronization with a blanking period of the data signal.

(2)

The transmission device according to (1), in which
   the clock signal transmitting circuit is a differential clock signal transmitting circuit that outputs a differential clock signal as the clock signal onto the clock signal line,
   the data signal transmitting circuit is a differential data signal transmitting circuit that outputs a differential data signal as the data signal onto the data signal line, and
   the blanking controller controls the differential clock signal transmitting circuit to output, as the predetermined blanking signal, a differential blanking signal in which a predetermined first signal value continues throughout a predetermined period or longer from the differential clock signal transmitting circuit to the clock signal line in synchronization with a starting time of the blanking period of the data signal.

(3)

The transmission device according to (2), in which the predetermined period is a longer period than a clock cycle of the clock signal.

(4)

The transmission device according to (2) or (3), in which the blanking controller controls the differential clock signal transmitting circuit to output a predetermined differential signal different from the differential blanking signal, in place of the differential blanking signal, from the differential clock signal transmitting circuit to the clock signal line in synchronization with an ending time of the blanking period of the data signal.

(5)

The transmission device according to (4), in which the blanking controller controls the differential clock signal transmitting circuit to output, as the predetermined differential signal, a differential signal in which a predetermined second signal value different from the predetermined first signal value continues throughout the predetermined period or longer from the differential clock signal transmitting circuit to the clock signal line.

(6)

The transmission device according to (4), in which the blanking controller controls the differential clock signal transmitting circuit to output the clock signal as the predetermined differential signal from the differential clock signal transmitting circuit to the clock signal line throughout the predetermined period or longer.

(7)

The transmission device according to (5), in which after a signal with the predetermined second signal value is outputted, the blanking controller controls the differential clock signal transmitting circuit to output the clock signal from the differential clock signal transmitting circuit to the clock signal line in the blanking period. The transmission device according to (4).

(8)

The transmission device according to any one of (2) to (2), in which the blanking controller further controls the data signal transmitting circuit to output at least a predetermined data blanking signal, in place of the data signal, from the data signal transmitting circuit to the data signal line in synchronization with the starting time of the blanking period of the data signal.

(9)

The transmission device according to (8), in which the blanking controller controls the data signal transmitting circuit to output, as the predetermined data blanking signal, a signal having an inverted value of a last signal value of the data signal.

(10)

The transmission device according to (8), in which the blanking controller controls the differential data signal transmitting circuit to output, as the predetermined data blanking signal, a differential signal with a value of 1.

(11)

The transmission device according to (8), in which after the predetermined data blanking signal is outputted, the blanking controller controls the differential data signal transmitting circuit to output a differential signal with a value of 0 in synchronization with an ending time of the blanking period of the data signal.

(12)

The transmission device according to (8), in which the blanking controller controls the differential data signal transmitting circuit to output a differential signal with a value of 0 throughout the whole blanking period as the predetermined data blanking signal.

(13)

The transmission device according to any one of (2) to (12), further including:
  a first single-end signal transmitting circuit that outputs a first single-end signal;
  a first transmission switching circuit that switches signal output paths to allow a signal to be outputted from one of the differential clock signal transmitting circuit and the first single-end signal transmitting circuit to the clock signal line;
  a second single-end signal transmitting circuit that outputs a second single-end signal; and
  a second transmission switching circuit that switches signal output paths to allow a signal to be outputted from one of the differential data signal transmitting circuit and the second single-end signal transmitting circuit to the data signal line.

(14)

A reception device including:
  a data signal receiving circuit that receives a data signal through a data signal line; and
  a clock signal receiving circuit that receives a clock signal and a predetermined blanking signal that is outputted in synchronization with a blanking period of the data signal through a clock signal line.

(15)

The reception device according to (14), in which
  the data signal receiving circuit is a differential data signal receiving circuit that receives a differential data signal as the data signal through the data signal line, and
  the clock signal receiving circuit is a differential clock signal receiving circuit that receives a differential clock signal as the clock signal and receives, as the predetermined blanking signal, a differential blanking signal that is outputted in such a manner that a predetermined first signal value continues throughout a predetermined period or longer in synchronization with a starting time of the blanking period of the data signal.

(16)

The reception device according to (15), in which
  the differential data signal receiving circuit has:
  a data signal termination circuit including a termination resistor coupled to the data signal line, and
  the differential clock signal receiving circuit has:
  a clock signal termination circuit including a termination resistor coupled to the clock signal line, and
  a termination control circuit allowing the data signal termination circuit and the clock signal termination circuit to turn off the respective termination resistors on a basis of the differential blanking signal.

(17)

The reception device according to (16), in which
  the differential clock signal receiving circuit further receives a differential signal that is different from the differential blanking signal and is outputted in synchronization with an ending time of the blanking period of the data signal through the clock signal line, and
  the termination control circuit allows the data signal termination circuit and the clock signal termination circuit to turn on the respective termination resistors on a basis of the predetermined differential signal.

(18)

The reception device according to any one of (15) to (17), further including:
  a first single-end signal receiving circuit that receives a first single-end signal through the clock signal line;
  a first reception switching circuit that switches whether or not to receive the first single-end signal;
  a second single-end signal receiving circuit that receives a second single-end signal through the data signal line; and
  a second reception switching circuit that switches whether or not to receive the second single-end signal.

(19)

A communication system including:
  a transmission device that outputs a clock signal onto a clock signal line, outputs a data signal onto a data signal line, and outputs a predetermined blanking signal in place of the clock signal in synchronization with a blanking period of the data signal; and
  a reception device that receives the data signal through the data signal line, and receives the clock signal and the predetermined blanking signal through the clock signal line.

(20)

The communication system according to (19), further including an oscillator that supplies the clock signal to the transmission device.

(21)

The communication system according to (19) or (20), in which
  the transmission device includes:
  a first single-end signal transmitting circuit that outputs a first single-end signal;
  a first transmission switching circuit that switches signal output paths to output one of the clock signal and the first single-end signal onto the clock signal line, a second single-end signal transmitting circuit that outputs a second single-end signal, and a second transmission switching circuit that switches signal output paths to output one of the data signal and the second single-end signal onto the data signal line, and the reception device includes:

a first single-end signal receiving circuit that receives the first single-end signal through the clock signal line, a first reception switching circuit that switches whether or not to receive the first single-end signal, a second single-end signal receiving circuit that receives the second single-end signal through the data signal line, and a second reception switching circuit that switches whether or not to receive the second single-end signal.

(22)

A signal transmission method including:

outputting a clock signal onto a clock signal line;

outputting a data signal onto a data signal line; and outputting a predetermined blanking signal, in place of the clock signal, onto the clock signal line in synchronization with a blanking period of the data signal.

(23)

A signal reception method including:

receiving a data signal through a data signal line; and receiving a clock signal and a predetermined blanking signal that is outputted in synchronization with a blanking period of the data signal through a clock signal line.

(24)

A communication method including:

outputting a clock signal onto a clock signal line;

outputting a data signal onto a data signal line;

outputting a predetermined blanking signal, in place of the clock signal, onto the clock signal line in synchronization with a blanking period of the data signal;

receiving the data signal through the data signal line; and receiving the clock signal and the predetermined blanking signal through the clock signal line.

This application claims the priority on the basis of Japanese Patent Application No. 2015-120465 filed on Jun. 15, 2015 and Japanese Patent Application No. 2015-205599 filed on Oct. 19, 2015 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A transmission device comprising:

a clock signal transmitting circuit configured to output a clock signal onto a clock signal line;

a data signal transmitting circuit configured to output a data signal onto a data signal line; and a transmission switching circuit configured to switch the clock signal transmitting circuit and the data signal transmitting circuit between a high speed differential signal mode and a low power signal mode, wherein the clock signal transmitting circuit includes:

a first selector configured to output a first selection signal;

a first parallel/serial conversion circuit configured to receive the first selection signal and output a first control signal; and a first high speed driver configured to receive the first control signal and, in a case where the clock signal transmitting circuit is in the high speed differential signal mode, to output the clock signal onto the clock line.

2. The transmission device according to claim 1, wherein the clock signal transmitting circuit includes a clock divider.

3. The transmission device according to claim 1, wherein the first selection signal is one of a toggle signal, a first predetermined signal, or a second predetermined signal.

4. The transmission device according to claim 1, wherein the data signal transmitting circuit includes:

a second selector configured to output a second selection signal;

a second parallel/serial conversion circuit configured to receive the second selection signal and output a second control signal; and a high speed driver configured to receive the second control signal and, in a case where the data signal transmitting circuit is in the high speed differential signal mode, to output the data signal onto the data line.

5. The transmission device according to claim 4, wherein the data signal transmitting circuit includes a state machine.

6. The transmission device according to claim 4, wherein second the selection signal is one of a transmission data signal, a synchronization code signal, a first predetermined signal, or a second predetermined signal.

7. The transmission device according to claim 4, further comprising:

a PLL circuit configured to supply an internal clock signal to the clock transmitting circuit and to the data transmitting circuit, wherein the first parallel/serial conversion circuit is configured to receive internal clock signal, and wherein the second parallel/serial conversion circuit is configured to receive the internal clock signal.

8. The transmission device according to claim 1, wherein the clock signal transmitting circuit includes:

a state machine configured to receive a clock lane control signal;

an encoder; and a low power driver configured, in a case where the clock signal transmitting circuit is in the low power signal mode, output the clock signal onto the clock line.

9. The transmission device according to claim 1, wherein the data signal transmitting circuit includes:

a state machine configured to receive a data transmission request signal;

an encoder; and a low power driver configured, in a case where the data signal transmitting circuit is in the low power signal mode, output the data signal onto the data line.

10. A reception device comprising:

a clock signal receiving circuit configured to receive a clock signal from a clock signal line;

a data signal receiving circuit configured to receive a data signal from a data signal line; and a reception switching circuit configured to switch the clock signal receiving circuit and the data signal receiving circuit between a high speed differential signal mode and a low power signal mode, wherein the clock signal receiving circuit includes:

a termination circuit configured to receive the clock signal from the clock signal line; and a high speed receiver configured, in a case where the clock signal receiving circuit is in the high speed differential signal mode, receive the clock signal through the termination circuit.

11. The reception device according to claim 10, wherein the clock signal receiving circuit further includes a clock divider configured to receive an output from the high speed receiver.

12. The reception device according to claim 10, wherein the termination circuit includes a termination resistor.

13. A reception device comprising:
- a clock signal receiving circuit configured to receive a clock signal from a clock signal line;
- a data signal receiving circuit configured to receive a data signal from a data signal line; and
- a reception switching circuit configured to switch the clock signal receiving circuit and the data signal receiving circuit between a high speed differential signal mode and a low power signal mode, wherein the data signal receiving circuit includes:
- a termination circuit configured to receive the data signal from the data signal line;
- a high speed receiver configured, in a case where the data signal receiving circuit is in the high speed differential signal mode, receive the data signal through the termination circuit; and
- a clock divider configured to receive an output from the high speed receiver.

* * * * *